US010015158B2

(12) United States Patent
Bender et al.

(10) Patent No.: US 10,015,158 B2
(45) Date of Patent: Jul. 3, 2018

(54) METHODS AND APPARATUS FOR USE IN ENABLING A MOBILE COMMUNICATION DEVICE WITH A DIGITAL CERTIFICATE

(75) Inventors: Christopher Lyle Bender, Waterloo (CA); Sam Cheng-Fu Shih, St. Catharines (CA); Neil Patrick Adams, Waterloo (CA)

(73) Assignee: BLACKBERRY LIMITED, Waterloo, ON (CA)

(*) Notice: Subject to any disclaimer, the term of this patent is extended or adjusted under 35 U.S.C. 154(b) by 2134 days.

(21) Appl. No.: 12/039,960

(22) Filed: Feb. 29, 2008

(65) Prior Publication Data
US 2009/0222902 A1   Sep. 3, 2009

(51) Int. Cl.
*H04L 29/06* (2006.01)
*G06F 21/33* (2013.01)

(52) U.S. Cl.
CPC .......... *H04L 63/0823* (2013.01); *G06F 21/33* (2013.01)

(58) Field of Classification Search
USPC .................. 726/10; 713/155–158, 175, 176; 380/255, 270
See application file for complete search history.

(56) References Cited

U.S. PATENT DOCUMENTS 5,781,723 A * 7/1998 Yee et al. ................. 726/20
6,477,150 B1  11/2002 Maggenti et al.
(Continued)

FOREIGN PATENT DOCUMENTS

EP       1494429 A2   1/2005
WO       03107710 A1  12/2003
WO       2008049959 A2  5/2008

OTHER PUBLICATIONS

"Wireless Application Protocol; WAP-235-PushOTA-20010425-a", Push OTA Protocol, XP-002240864, pp. 1-44, Apr. 25, 2001.
(Continued)

*Primary Examiner* — Amare F Tabor
(74) *Attorney, Agent, or Firm* — Integral IP; Miriam Paton; Amy Scouten

(57) ABSTRACT

In one illustrative scenario, a mobile communication device causes a communication session to be established with a host server of a communication network. The mobile device performs communication operations in the communication session for activating a communication service, such as a data synchronization service, with the host server. In the communication session, the mobile device also receives configuration information which includes information for use in constructing a request message for obtaining a digital certificate from a certificate authority (CA). After receipt of the configuration information, the mobile device constructs the request message for the digital certificate and causes it to be sent to the host server. In response, the host server requests and obtains the digital certificate from the CA on behalf of the mobile device, and thereafter "pushes" the received digital certificate to the mobile device. The mobile device receives the digital certificate and stores it for use in subsequent communications. The host server may be part of a local area network (LAN) which includes a wireless LAN (WLAN) adapted to authenticate the mobile device based on the digital certificate, so that the mobile device may obtain access to the WLAN.

40 Claims, 11 Drawing Sheets

(56) References Cited

U.S. PATENT DOCUMENTS

| | | | |
|---|---|---|---|
| 6,516,316 B1 | 2/2003 | Ramasubramani et al. | |
| 6,578,151 B1* | 6/2003 | Nilsen | 726/11 |
| 6,721,787 B1* | 4/2004 | Hiscock | 709/217 |
| 6,980,660 B1 | 12/2005 | Hind et al. | |
| 7,231,371 B1 | 6/2007 | Cantini et al. | |
| 7,486,651 B2* | 2/2009 | Hagiwara et al. | 370/338 |
| 7,529,933 B2* | 5/2009 | Palekar et al. | 713/168 |
| 7,584,360 B2* | 9/2009 | Kasaura et al. | 713/175 |
| 7,770,204 B2* | 8/2010 | Pathakis et al. | 726/2 |
| 7,840,812 B1* | 11/2010 | Levenberg | 713/176 |
| 8,037,309 B2* | 10/2011 | Ooi et al. | 713/176 |
| 8,064,598 B2* | 11/2011 | Vaha-Sipila et al. | 380/247 |
| 2001/0054115 A1* | 12/2001 | Ferguson et al. | 709/248 |
| 2002/0038420 A1 | 3/2002 | Collins et al. | |
| 2002/0067832 A1 | 6/2002 | Jablon | |
| 2002/0178370 A1 | 11/2002 | Gurevich et al. | |
| 2003/0126433 A1 | 7/2003 | Hui | |
| 2003/0163700 A1* | 8/2003 | Paatero | 713/175 |
| 2003/0196084 A1* | 10/2003 | Okereke et al. | 713/156 |
| 2003/0204734 A1 | 10/2003 | Wheeler | |
| 2004/0242229 A1 | 12/2004 | Okazaki | |
| 2004/0267878 A1 | 12/2004 | Osias | |
| 2004/0268148 A1 | 12/2004 | Karjala et al. | |
| 2005/0091484 A1 | 4/2005 | Thornton et al. | |
| 2005/0111467 A1 | 5/2005 | Ng et al. | |
| 2005/0144144 A1 | 6/2005 | Graff | |
| 2005/0144485 A1 | 6/2005 | Mousseau | |
| 2005/0154795 A1 | 7/2005 | Kuz et al. | |
| 2005/0160161 A1 | 7/2005 | Barrett et al. | |
| 2005/0287990 A1 | 12/2005 | Mononen et al. | |
| 2006/0002556 A1* | 1/2006 | Paul | 380/270 |
| 2006/0075242 A1 | 4/2006 | Aissi et al. | |
| 2006/0080534 A1 | 4/2006 | Yeap et al. | |
| 2006/0168444 A1 | 7/2006 | Miller et al. | |
| 2006/0174106 A1 | 8/2006 | Bell | |
| 2006/0294368 A1 | 12/2006 | Adams et al. | |
| 2007/0098176 A1 | 5/2007 | Song | |
| 2007/0150723 A1 | 6/2007 | Estable et al. | |
| 2008/0022103 A1 | 1/2008 | Brown et al. | |
| 2008/0170690 A1* | 7/2008 | Tysowski | 380/270 |
| 2008/0170697 A1 | 7/2008 | Heinonen et al. | |
| 2009/0222657 A1 | 9/2009 | Bender et al. | |
| 2010/0100731 A1 | 4/2010 | Mok et al. | |

OTHER PUBLICATIONS

Research in Motion Limited, "BlackBerry Enterprise Server Version 3.6 for Microsoft Exchange", pp. 1-18, 2003.

Wireless LAN (WLAN) End to End Guidelines for Enterprises and Public Hotspot Service Providers, Intel Communications, Release 1.1 Nov. 2003.

Certificate Authority Proxy Function, Cisco IP Phone Authentication and Encryption for Cisco Call Manager, 4.0(1).

Step-By-Step Guide to Deploying Microsoft Exchange Server 2003 SP2 Mobile Messaging With Windows Mobile 5.0-Based Devices, Windows Mobile, Mar. 2006.

Provisioning Architecture Overview Version Mar. 14, 2001, Wireless Application Protocol WAP-182-ProvArch-20010314-a, Wireless Application Protocol Forum Ltd., Mar. 14, 2001.

Provisioning Bootstrap Version Mar. 14, 2001, Wireless Application Protocol WAP-182-ProvArch-20010314-a, Wireless Application Protocol Forum Ltd., Mar. 14, 2001.

Push-to-talk over Cellular (PoC); Architecture; PoC Release 2.0; Technical Specification, Architecture V2.0.8 (Jun. 2004).

S/MIME Support Package, Release 4.0, White Paper, 2005, Research in Motion Limited.

BlackBerry Security, White Paper, Release 4.0, 2005, Research in Motion Limited.

U.S. Office Action for U.S. Appl. No. 12/039,991, dated Feb. 29, 2008.

Extended European Search Report, Application # 08152168.4, dated Jul. 16, 2008.

Extended European Search Report, Application # 08152166.8, dated Jul. 16, 2008.

Tam, Allan, First Office Action for CA 2,655,078, dated Feb. 15, 2012.

Fourth Office Action for U.S. Appl. No. 12/039,991, dated Oct. 30, 2013.

Nystrom, M. et al., PKCS #9: Selected Object Classes and Attribute Types, RFC 2985, Nov. 2000.

RSA Laboratories,, "PKCS #10 v1.7: Certification Request Syntax Standard", May 26, 2000.

First Office Action for CA 2,655,073, dated Apr. 27, 2012.

Second Office Action for CA 2,655,073, dated Apr. 10, 2013.

Bechtel, Kevin M., Fourth Office Action for U.S. Appl. No. 13/039,991, dated Mar. 7, 2014.

Tam, Allan, Third Office Action for CA 2655073, dated Apr. 7, 2014.

Bechtel, Fifth Office Action for U.S. Appl. No. 12/039,991, dated Jun. 9, 2015.

Myers, [RFC2797] Myers, M. Request for Comments: 2797. "Certificate Management Messages over CMS". Network Working Group. (http://www.rfc-editor.org/pdfrfc/rfc2797.txt.pdf) Published: Apr. 2000.

Nystrom, et al., PKCS 10: Certification Request Syntax Specification, RFC 2986, Ver 1.7, Nov. 2000.

Tam, Fourth Office Action for CA2655073 dated May 27, 2015.

Bechtel, Sixth Office Action for U.S. Appl. No. 12/039,991 dated Sep. 25, 2015.

Bechtel, Notice of Allowance for U.S. Appl. No. 12/039,991 dated Jun. 22, 2016.

Tam, Fifth Office Action for CA2,655,073 dated May 6, 2016.

\* cited by examiner

METHODS AND APPARATUS FOR USE IN ENABLING A MOBILE COMMUNICATION DEVICE WITH A DIGITAL CERTIFICATE

CROSS REFERENCE TO RELATED APPLICATION

The present application hereby references U.S. non-provisional patent application entitled "Methods And Apparatus For Use In Obtaining A Digital Certificate For A Mobile Communication Device" having application Ser. No. 12/039,991 and filing date of 29 Feb. 2008, which is hereby incorporated by reference herein.

BACKGROUND

Field of the Technology

The present disclosure relates generally to mobile communication devices operative for communications via wireless communication networks, and more particularly to methods and apparatus for enabling a mobile communication device with a digital certificate for communications.

Description of the Related Art

A mobile communication device may be adapted to communicate with a host server of a communication network. Such communications may be facilitated over a wireless link with a cellular telecommunications network, or over a wired connection with a computer connected in the communication network, as examples. The communication network may be a private network of an enterprise, such as a company. The host server of the communication network may provide one or more communication services for the mobile device. For example, the host server may be adapted to provide a data synchronization service for synchronizing user data items of an application program associated with a user account of the mobile device. The application program may be or include, for example, an electronic mail (e-mail) application program for the communication of e-mail messages.

Wireless access to the communication network may be further provided via a wireless network, such as a wireless local area network (WLAN) operative in accordance with IEEE 802.11 standards. One communication service provided in a communication network having a WLAN may be a voice telephony service, such as a voice telephony service based on Voice over IP (VoIP) communications.

Access to the communication network via the WLAN may be restricted to authorized users, for example, employees of the enterprise. In some cases, password authentication in itself is insufficient and certificate use is preferred or required. Some security protocols, such as those utilizing an Extensible Authentication Protocol (EAP), require digital certificates from mobile devices for authentication. Thus, the mobile device may need to have a digital certificate that is trusted by an authentication server for opening or allowing the connection to the network.

What are needed are more efficient methods and apparatus for use in enabling a mobile communication device with a digital certificate.

BRIEF DESCRIPTION OF THE DRAWINGS

Embodiments of the present application will now be described, by way of example only, with reference to the attached figures. In at least most cases, the same reference numerals are used in different figures to denote similar elements.

DETAILED DESCRIPTION OF THE PREFERRED EMBODIMENTS

Figure 1:
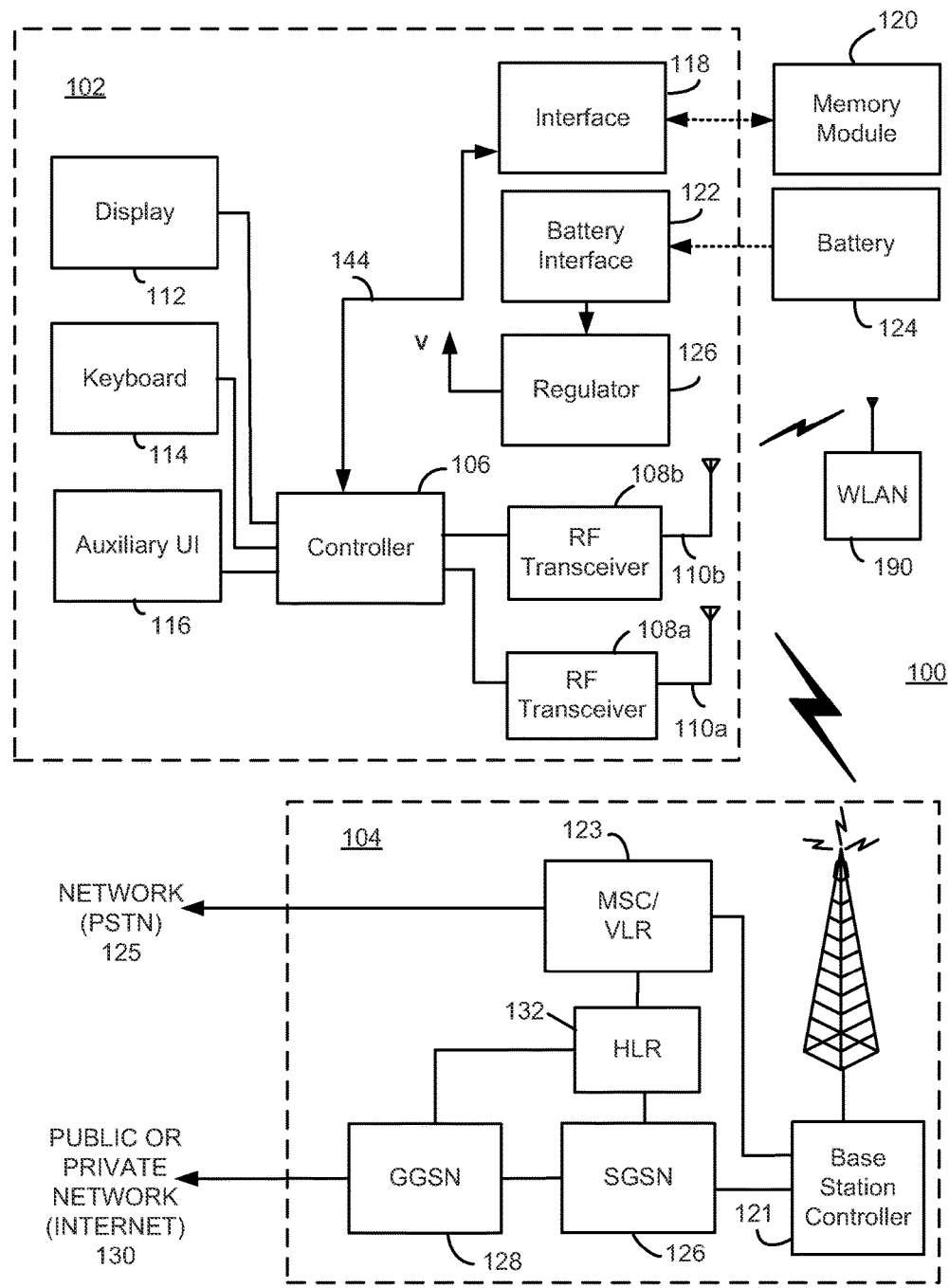
FIG. 1 is a block diagram illustrating components of a mobile communication device which may be adapted to communicate in a cellular telecommunications network.

According to one illustrative environment within which techniques of the present disclosure may be practiced, a mobile communication device is adapted to communicate with a host server of a communication network. Such communications may be facilitated over a wireless link with a cellular telecommunications network, or over a wired connection with a computer connected in the communication network, as examples. The communication network may be a private network of an enterprise (e.g., a company, governmental organization, healthcare organization, financial institution, educational institution, etc.). The host server of the communication network may provide one or more communication services for the mobile device. For example, the host server may be adapted to provide a data synchronization service for synchronizing user data items of an application program associated with a user account of the mobile device. The application program may be or include, for example, an electronic mail (e-mail) application program for the communication of e-mail messages.

Wireless access to this (or other) communication network may further be provided via a wireless network, such as a wireless local area network (WLAN) operative in accordance with IEEE 802.11 standards. One communication service provided in such communication network having the WLAN is a voice telephony service, such as a voice telephony service based on Voice over IP (VoIP) communications. Access to the communication network via the WLAN may be restricted to authorized users, for example, to mobile devices of certain employees of the enterprise. In one particular embodiment, an authentication procedure such as an Extensible Authentication Protocol (EAP) (e.g. EAP Transport Layer Security or "EAP TLS") is utilized for wireless access via the WLAN, which requires a digital certificate from the mobile device for authentication by an authentication server.

In this environment, traditional procedures for obtaining digital certificates are manual and cumbersome for the user of a mobile device, and may involve much processing at the mobile device itself. Further, distribution and control of digital certificates is weak from the perspective of an administrator of a communication network.

In one illustrative technique of the present disclosure, the mobile device is initially not "activated" for the communication service of the host server. For activating the communication service, the mobile device causes a communication session to be established with the host server. This communication session may be facilitated over a wireless link with the cellular telecommunications network, or over the wired connection with the computer connected in the communication network, as examples. This communication session is typically over a secure connection (e.g. an encrypted or tunneled connection).

The mobile device then performs communication operations in the communication session for activating the communication service (e.g. the data synchronization service) with the host server. Note that when the mobile device is properly activated for the communication service, the host server creates a stored mapping of a user account name or identifier of the user account with a unique identifier of the mobile device (e.g. a personal identification number or "PIN"). When communications are required with the mobile device, the unique identifier of the mobile device is used to route the messages for the communication service to/from the device through the system.

In the communication session with the host server, the mobile device may also receive configuration information (or "profile") from the host server. The configuration information includes a certificate authority (CA) profile or information for use in constructing a request message for obtaining a digital certificate from a certificate authority (CA). An administrator of the communication network may set and program the configuration information or profile in the host server for the mobile device. In other embodiments, the user of the mobile device is able to enter and set this information through a user interface of the mobile device. The CA may reside outside of the communication network, but in some embodiments it may reside within the communication network. After receipt of the configuration information, the mobile device constructs the request message for the digital certificate and causes it to be sent to the host server.

In response to receipt of the request message, the host server establishes a connection with the CA, requests and obtains the digital certificate from the CA on behalf of the mobile device, and thereafter "pushes" the received digital certificate to the mobile device. The mobile device receives the digital certificate and stores it for use in subsequent communications. For example, the mobile device may thereafter obtain access to the communication network via the WLAN which is adapted to authenticate the mobile device based on the digital certificate.

As apparent, control and distribution of digital certificates is more easily managed with use of a procedure that is more efficient and automatic from the perspective of the user of the mobile device. Processing power and power consumption at the mobile device may be reduced.

One illustrative environment of the present disclosure will now be described in relation to the drawings. FIG. 1 is a schematic block diagram which reveals the basic components of a mobile communication device 102 which operates in a wireless communication system 100. As shown in FIG. 1, mobile device 102 is adapted to communicate with a wireless communication network 104 which is a cellular telecommunications network (which may be referred to as a wireless wide area network of "WWAN"). Also as shown, mobile device 102 is adapted to communicate with a wireless local area network or "WLAN" 190 such as an IEEE 802.11-based wireless network. For wireless communication with wireless network 104, mobile device 102 utilizes radio frequency (RF) transceiver circuitry 108a and an antenna 110a. For wireless communication with WLAN 190, mobile device 102 utilizes RF transceiver circuitry 108b for IEEE 802.11-based communications and an antenna 110b.

With such configuration, mobile device 102 may be referred to as a "dual mode" communication device. Although shown in FIG. 1 as having separate and independent transceiver components, at least some portions or components of these otherwise different transceivers may be shared where possible. In an alternate embodiment, mobile device 102 has only a single transceiver and is operative in only one of the different types of networks.

Mobile device 102 may include a visual display 112, a keyboard 114, and perhaps one or more auxiliary user interfaces (UI) 116, each of which is coupled to a controller 106. Controller 106 is also coupled to RF transceiver circuitry 108a and antenna 110a as well as RF transceiver circuitry 108b and antenna 110b. Typically, controller 106 is embodied as a central processing unit (CPU) which runs operating system software in a memory component (not shown). Controller 106 will normally control overall operation of mobile device 102, whereas signal-processing operations associated with communication functions are typically executed by the RF transceiver circuitry. Controller 106 interfaces with device display 112 to display received information, stored information, user inputs, and the like. In some embodiments, display 112 may comprise a touchscreen display. Some examples of displays 112 incorporating a touch interface include resistive, capacitive, projected capacitive, infrared and surface acoustic wave (SAW) touchscreens. Keyboard 114, which may be a telephone type keypad or full alphanumeric keyboard, is normally provided for entering data for storage in mobile device 102, information for transmission to network 104, a telephone number to place a telephone call, commands to be executed on mobile device 102, and possibly other or different user inputs. In various embodiments, keyboard 114 may comprise a virtual keyboard, a physical keyboard, or both.

Mobile device 102 sends communication signals to and receives communication signals over wireless communication links. For example, mobile device 102 communicates with wireless network 104 via antenna 110a. RF transceiver circuitry 108a performs functions similar to those of a base station controller 121 of the wireless network 104, including for example modulation/demodulation and possibly encoding/decoding and encryption/decryption. In the embodiment of FIG. 1, wireless communications are configured in accordance with Global Systems for Mobile communications (GSM) and General Packet Radio Service (GPRS) technologies. However, any suitable type of communication protocols may be utilized. For example, the network may be based on Evolution Data Only (EV-DO), code division multiple access (CDMA), Universal Mobile Telecommunications System (UMTS), or other suitable technologies. It will be apparent to those skilled in art that RF transceiver circuitry 108a will be adapted to particular wireless network or networks in which mobile device 102 is intended to operate.

Mobile device 102 may also include a battery interface 122 for receiving one or more rechargeable batteries 124. Battery 124 provides electrical power to electrical circuitry in mobile device 102, and battery interface 122 provides for a mechanical and electrical connection for battery 124. Battery interface 122 is coupled to a regulator 126 which regulates power to the device. In some embodiments, mobile device 102 may be solar-powered. Mobile device 102 may also include a memory module 120, such as a Subscriber Identity Module (SIM) (or e.g. a Universal SIM or U-SIM, or a Removable User Identity Module or R-UIM), which is connected to or inserted in mobile device 102 at an interface 118.

Mobile device 102 may consist of a single unit, such as a data communication device, a cellular telephone, a multiple-function communication device with data and voice communication capabilities, a personal digital assistant (PDA) enabled for wireless communication, or a computer incorporating an internal modem. In one embodiment, mobile device 102 has a very small size, is able to fit within a hand of an end user, and therefore may be referred to as a wireless handheld communication device. On the other hand, mobile device 102 may be a multiple-module unit comprising a plurality of separate components, including but in no way limited to a computer or other device connected to a wireless modem. In particular, for example, in the mobile device block diagram of FIG. 1, RF transceiver circuitry 108a and antenna 110a may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108a and antenna 110a of a single-unit device such as one of those described above. Such a mobile device 102 may have a more particular implementation as described later in relation to mobile station of FIG. 3.

Using RF transceiver circuitry 108a, mobile device 102 communicates in and through wireless communication network 104. Again, in the embodiment of FIG. 1, wireless network 104 is configured in accordance with GSM and GPRS technologies; however, it should be understood that any suitable type of communication protocols may be utilized, such as CDMA, CDMA2000, EV-DO, UMTS, etc. In this specific embodiment, wireless network 104 includes a base station controller (BSC) 121 with an associated tower station, a Mobile Switching Center (MSC) 123, a Home Location Register (HLR) 132, a Serving GPRS Support Node (SGSN) 126, and a Gateway GPRS Support Node (GGSN) 128. MSC 123 is coupled to BSC 121 and to a landline network, such as a Public Switched Telephone Network (PSTN) 125. SGSN 126 is coupled to BSC 121 and to GGSN 128, which is in turn coupled to a public or private data network 130 (such as the Internet). HLR 132 is coupled to MSC 123, SGSN 126, and GGSN 128.

The tower station coupled to BSC 121 may be a fixed transceiver station, and the tower station and BSC 121 may together be referred to as fixed transceiver equipment. The fixed transceiver equipment provides wireless network coverage for a particular coverage area commonly referred to as a "cell". The transceiver equipment transmits communication signals to and receives communication signals from mobile devices within its cell via the tower station. The transceiver equipment normally performs such functions as modulation and possibly encoding and/or encryption of signals to be transmitted to the mobile device in accordance with particular, usually predetermined, communication protocols and parameters, under control of its controller. The transceiver equipment similarly demodulates and possibly decodes and decrypts, if necessary, any communication signals received from mobile device 102 within its cell. Communication protocols and parameters may vary between different networks. For example, one network may employ a different modulation scheme and operate at different frequencies than other networks.

For all mobile devices 102 registered with a network operator, permanent data (such as a user profile of mobile device 102) as well as temporary data (such as mobile device's 102 current location) are stored in HLR 132. In case of a voice call to mobile device 102, HLR 132 is queried to determine the current location of mobile device 102. A Visitor Location Register (VLR) of MSC 123 is responsible for a group of location areas and stores the data of those mobile devices that are currently in its area of responsibility. This includes parts of the permanent mobile device data that have been transmitted from HLR 132 to the VLR for faster access. However, the VLR of MSC 123 may also assign and store local data, such as temporary identifications. Optionally, the VLR of MSC 123 may be enhanced for more efficient co-ordination of GPRS and non-GPRS services and functionality (e.g. paging for circuit-switched calls which may be performed more efficiently via SGSN 126, and combined GPRS and non-GPRS location updates).

SGSN 126 is at the same hierarchical level as MSC 123 and keeps track of the individual locations of mobile devices. SGSN 126 also performs security functions and access control. GGSN 128 provides interworking with external packet-switched networks and is connected with SGSNs (such as SGSN 126) via an IP-based GPRS backbone network. SGSN 126 performs authentication and cipher setting procedures based on the same algorithms, keys, and criteria as in existing GSM. In conventional operation, cell selection may be performed autonomously by mobile device 102 or by the fixed transceiver equipment instructing mobile device 102 to select a particular cell. Mobile device 102 informs wireless network 104 when it reselects another cell or group of cells, known as a routing area.

In order to access GPRS services, mobile device 102 first makes its presence known to wireless network 104 by performing what is known as a GPRS "attach". This operation establishes a logical link between mobile device 102 and SGSN 126 and makes mobile device 102 available to receive, for example, pages via SGSN, notifications of incoming data, or SMS messages over GPRS. In order to send and receive GPRS data, mobile device 102 assists in activating the packet data address that it wants to use. This operation makes mobile device 102 known to GGSN 128; interworking with external data networks may thereafter commence. User data may be transferred transparently between mobile device 102 and the external data networks using, for example, encapsulation and tunneling. Data packets are equipped with GPRS-specific protocol information and transferred between mobile device 102 and GGSN 128.

Although the present embodiment relates to a WLAN of the IEEE 802.11 type and a WWAN of the cellular network type, any suitable wireless network technologies may be utilized, such as WiMAX technologies (e.g. IEEE 802.16e-based technologies). For example, the WLAN may be an IEEE 802.11-based network and the WWAN may be an IEEE 802.16e-based network. As another example, the WLAN may be an IEEE 802.16e-based network and the WWAN may be the cellular network. The communications may alternatively be adapted in accordance with BLUETOOTH™ standards (e.g. the BLUETOOTH™ standards may be based on BLUETOOTH™ Specification Version 2.0, Volumes 1 and 2). Also alternatively, as mentioned earlier, the mobile device may only have a single transceiver and be operative in only one of these different types of networks.

Figure 2:
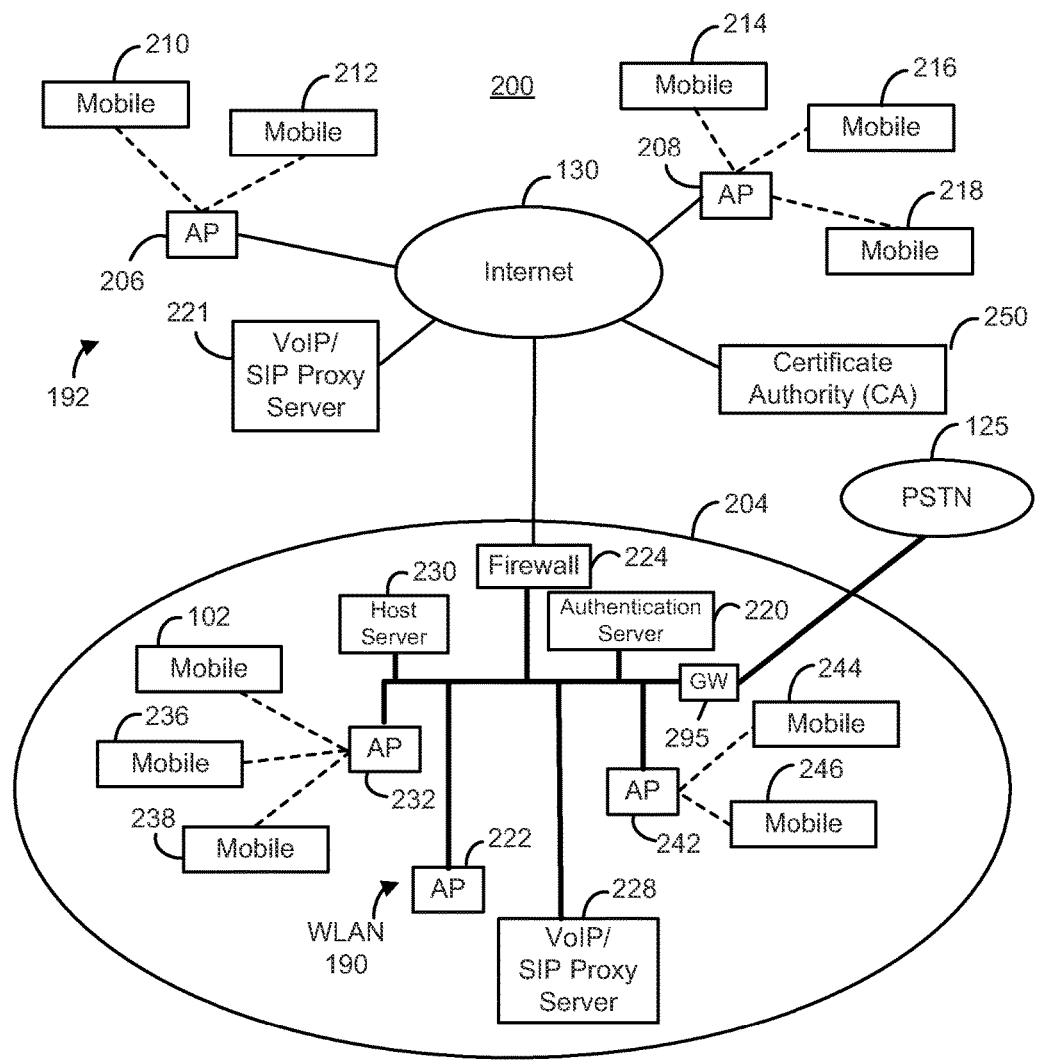
FIG. 2 is a block diagram illustrating components of a public or private local area network (LAN) which includes a host server and a wireless LAN (WLAN) (e.g. an IEEE 802.11-based network) in which the mobile device of FIG. 1 may communicate.

To illustrate the basic WLAN environment and architecture in more detail, FIG. 2 is a block diagram which reveals a communication system 200 which includes a public network 130 (e.g. the Internet 130) and a (private) communication network 204. In the present embodiment, communication network 204 is a local area network (LAN) which includes the WLAN 190 of FIG. 1. In the WLAN, mobile devices (e.g. mobile device 102) may obtain wireless access to networks through wireless access points (APs) as shown. Such terminals and wireless APs may operate in accordance with IEEE 802.11 standards, for example. The mobile devices shown in public network 130 include mobile devices 210 and 212 which have interfaced with wireless AP 206, and mobile devices 214, 216, and 218 which have interfaced with wireless AP 208. The mobile devices shown in private network 204 include mobile devices 102, 236, 238 which have interfaced with wireless AP 232, and mobile devices 244 and 246 which have interfaced with wireless AP 242. Outside of the networks 130 and 204 of FIG. 2 is a wireless wide area network (WWAN) (not shown in FIG. 2) which may be a cellular telecommunication network having a plurality of base stations and additional components (e.g. see FIG. 1). At least some of the mobile devices of FIG. 2 may be adapted to operate in both WLANs and WWANs.

Communication network 204 which includes WLAN 190 provides various data and communication services to its mobile devices or terminals. For example, communication network 204 may provide for voice telephony communication services for its mobile devices with use of VoIP communications. For these types of VoIP services, communication network 204 may utilize servers such as a Session Initiation Protocol (SIP) proxy server 228 to help facilitate VoIP communications. In the present embodiment, communication system 200 has a SIP proxy server 221 in a public network 192 as well. Note that some communication applications utilized by communication, such VoIP applications, require the use of SIP. SIP is documented in standard documents such as Request For Comments (RFC) 3261.

As apparent, mobile devices may operate to place and receive voice calls via WLAN 190 with the assistance of SIP components such as SIP proxy servers 221 and 228. SIP proxy servers may include one or more SIP functional components such as proxy server functionality, registrar server functionality, redirect server functionality, and location server functionality. Voice calls to a mobile device in WLAN 190 are typically made with use of a SIP identity or SIP address. A SIP address is an e-mail address in the format of sip:userID@gateway.com, for example. The user ID may be a user name or an E.164 address. Mobile devices typically register with a registrar server using their assigned SIP addresses. When a caller calls a mobile device, an INVITE request is sent to the proxy server which identifies the proper path and forwards the request to the mobile device. A gateway 295 (e.g. a VoIP-to-PSTN, PSTN-to-VoIP gateway) is connected in communication network 204 and is operative to communicate with a public switched telephone network (PSTN) 125 so that voice calls may be made through ordinary telephone lines (and e.g. mobile devices in wireless network 104) as well as through IP networks. Thus, in the case of an incoming call through PSTN 125, gateway 295 is operative to issue this INVITE request in response to detecting the incoming call. The mobile device responds to the proxy server which, in turn, forwards the response to the caller (via gateway 295 if the call is through PSTN 125). A VoIP session for VoIP communications may then proceed between the caller and the mobile device. When a redirect server is used, the caller sends an INVITE request to the redirect server which contacts a location server to determine the path of the mobile device. The redirect server sends the location information back to the caller, which sends a request to the mobile device at the address indicated in the redirection information.

A host server 230 is also connected and part of communication network 204. Host server 230 may provide one or more communication services to terminals and mobile devices having properly established and activated user accounts. One communication service that host server 230 may provide is a data synchronization service. For example, host server 230 may be adapted to maintain data synchronization with mobile devices over wireless network 104 (see FIGS. 1 and 4) for user data of an application program (e.g. PIM application) associated with a user account. The application program may be or include, for example, an electronic mail (e-mail) application program for the communication of e-mail messages. In this case, the data synchronization comprises a message synchronization for the e-mail messages associated with the user account for an e-mail application program. The data synchronization may alternatively or additionally be or include an address book synchronization for address book contacts in an address book organizer, or a calendar appointment synchronization for calendar appointments in a calendar application program. For the data-synchronized communications, host server 230 maintains storage of a mapping of a user account name or identifier of the user account with a unique identification number (e.g. a personal identification number or "PIN") of the mobile device. When communications are required with the mobile device, the personal identification number may be used to route the messages to/from the source device through the system.

In a communication network 204 that is deemed "private," a firewall 224 is often provided for preventing unauthorized access from unauthorized users (e.g. users through public network 130). An authentication server 220 may be connected and made part of communication network 204 as well. In one embodiment of the present techniques, digital certificates of mobile devices are utilized for authentication by authentication server 220 for the mobile devices to access the communication network via WLAN 190. Authentication which involves digital certificates may be performed by authentication server 220 based on a security protocol, such as one based on EAP (e.g. EAP Transport Layer Security or "EAP TLS"). Digital certificates may be originally obtained via electronic communications from a CA 250 on a certificate server (CS). CA 250 may reside outside of communication network 204, but may be accessible via another communication network, such as a public network or the Internet 130 as shown in FIG. 2.

Figure 3:
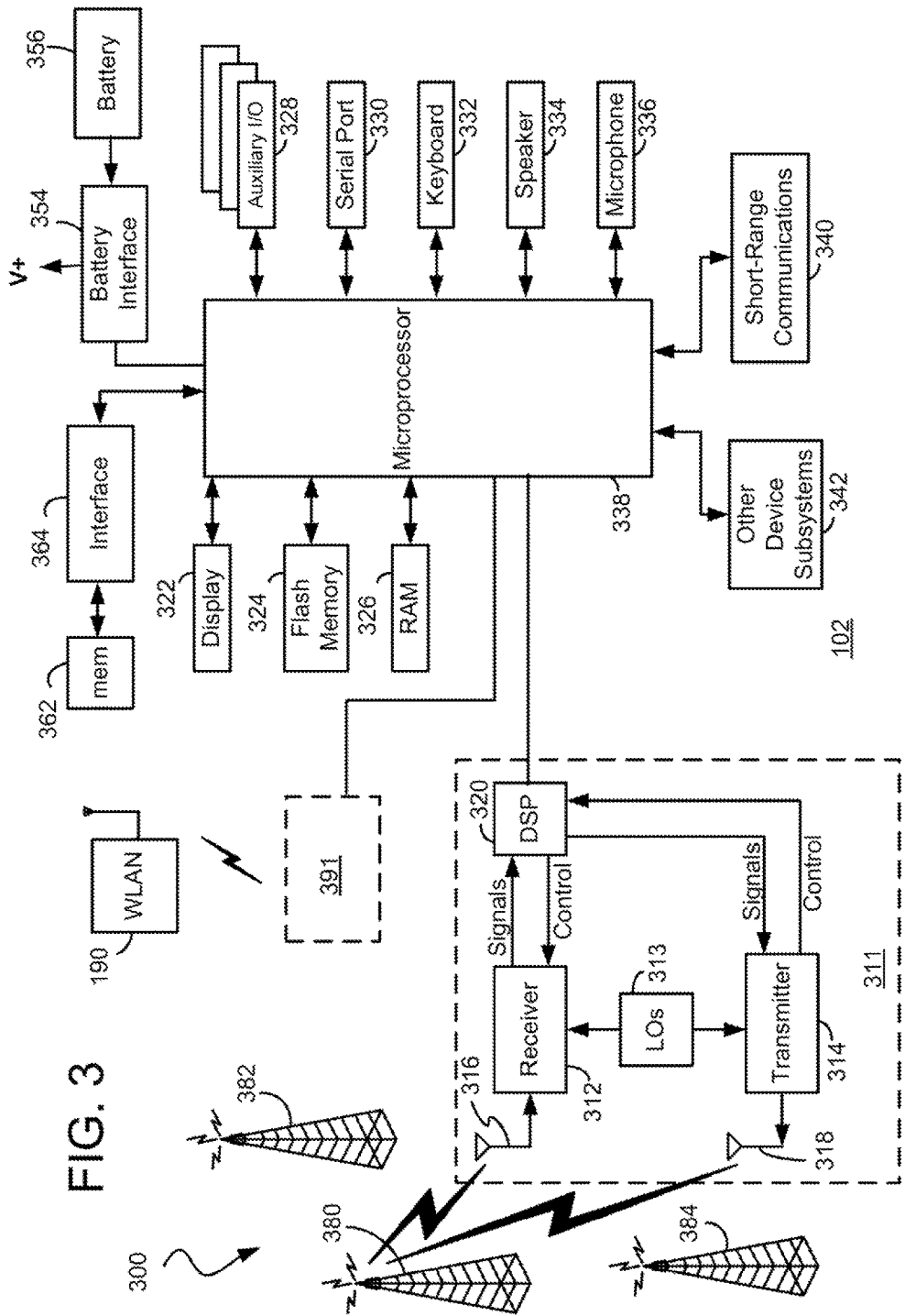
FIG. 3 is a more detailed diagram of the mobile device of FIGS. 1 and 2.

Referring now to FIG. 3, electrical components of an exemplary mobile device 102 (e.g. a mobile terminal or mobile station) will be described. Mobile device 102 is adapted to operate in connection with the communications systems 100/200 of FIGS. 1 and 2 (WLAN and WWAN). Mobile device 102 may have at least voice and advanced data communication capabilities, including the capability to communicate with other computer systems. Depending on the functionality provided by mobile device 102, it may be referred to as a data messaging device, a two-way pager, a cellular telephone with data messaging capabilities, a wireless Internet appliance, or a data communication device (with or without telephony capabilities).

As described, mobile device 102 is adapted to wirelessly communicate with WLAN 190. Also as shown, mobile device 102 may be adapted to wirelessly communicate with cellular base station transceiver systems 300. For communication with cellular networks, mobile device 102 utilizes communication subsystem 311. For communication with WLANs, mobile device 102 utilizes an additional communication subsystem 391 which has the same or similar structural components as communication subsystem 311. With such configuration, mobile device 102 may be referred to as a "dual mode" mobile station. Although shown in FIG. 3 as having separate and independent subsystems, at least some portions or components of these otherwise different subsystems may be shared where possible. Again, mobile device 102 may only have a single transceiver and be operative in only one of these different types of networks.

Communication subsystem 311 includes a receiver 312, a transmitter 314, and associated components, such as one or more (which may be embedded or internal) antenna elements 316 and 318, local oscillators (LOs) 313, and a processing module such as a digital signal processor (DSP) 320. Communication subsystem 311 is analogous to RF transceiver circuitry 108a and antenna 110a shown in FIG. 1. As will be apparent to those skilled in field of communications, particular design of communication subsystem 311 depends on the communication network in which mobile device 102 is intended to operate.

Mobile device 102 may send and receive communication signals through the network after required network procedures have been completed. Signals received by antenna 316 through the network are input to receiver 312, which may perform such receiver functions as signal amplification, frequency down conversion, filtering, channel selection, and the like, and in the example shown in FIG. 3, analog-to-digital (A/D) conversion. A/D conversion of a received signal allows more complex communication functions such as demodulation and decoding to be performed in DSP 320. In a similar manner, signals to be transmitted are processed, including modulation and encoding, for example, by DSP 320. These DSP-processed signals are input to transmitter 314 for digital-to-analog (D/A) conversion, frequency up conversion, filtering, amplification and transmission over communication network via antenna 318. DSP 320 not only processes communication signals, but also provides for receiver and transmitter control. For example, the gains applied to communication signals in receiver 312 and transmitter 314 may be adaptively controlled through automatic gain control algorithms implemented in DSP 320.

Network access is associated with a subscriber or user of mobile device 102, and therefore mobile device 102 utilizes a memory module 362, such as a Subscriber Identity Module or "SIM" card, a Universal SIM (U-SIM), or a Removable User Identity Module (R-UIM), to be inserted in or connected to an interface 364 of mobile device 102 in order to operate in the network. Since mobile device 102 is a mobile battery-powered device, it also includes a battery interface 354 for receiving one or more rechargeable batteries 356. Such a battery 356 provides electrical power to most if not all electrical circuitry in mobile device 102, and battery interface 354 provides for a mechanical and electrical connection for it. Battery interface 354 is coupled to a regulator (not shown in FIG. 3) that provides a regulated voltage to all of the circuitry.

Mobile device 102 includes a microprocessor 338 that controls overall operation of mobile device 102. This control includes the certificate-related techniques of the present disclosure. Communication functions, including at least data and voice communications, are performed through communication subsystem 311. Microprocessor 338 also interacts with additional device subsystems such as a display 322, a flash memory 324, a random access memory (RAM) 326, auxiliary input/output (I/O) subsystems 328, a serial port 330, a keyboard 332, a speaker 334, a microphone 336, a short-range communications subsystem 340, and any other device subsystems generally designated at 342. Some of the subsystems shown in FIG. 3 perform communication-related functions, whereas other subsystems may provide "resident" or on-device functions. Notably, some subsystems, such as keyboard 332 and display 322, for example, may be used for both communication-related functions, such as entering a text message for transmission over a communication network, and device-resident functions such as a calculator or task list. Operating system software used by microprocessor 338 may be stored in a persistent store such as flash memory 324, which may alternatively be a read-only memory (ROM) or similar storage element (not shown). Those skilled in the art will appreciate that the operating system, specific device applications, or parts thereof, may be temporarily loaded into a volatile store such as RAM 326.

Microprocessor 338, in addition to its operating system functions, enables execution of software applications on mobile device 102. A predetermined set of applications that control basic device operations, including at least data and voice communication applications, will normally be installed on mobile device 102 during its manufacture. An application that may be loaded onto mobile device 102 may be a personal information manager (PIM) application having the ability to organize and manage data items relating to user such as, but not limited to, e-mail, calendar events, voice mails, appointments, and task items. Naturally, one or more memory stores are available on mobile device 102 and SIM 356 to facilitate storage of PIM data items and other information.

The PIM application may have the ability to send and receive data items via the wireless network. In accordance with various embodiments, PIM data items are seamlessly integrated, synchronized, and updated via the wireless network, with the wireless device user's corresponding data items stored and/or associated with a host computer system thereby creating a mirrored host computer on mobile device 102 with respect to such items. This is especially advantageous where the host computer system is the wireless device user's office computer system. Additional applications may also be loaded onto mobile device 102 through network, an auxiliary I/O subsystem 328, serial port 330, short-range communications subsystem 340, or any other suitable subsystem 342, and installed by a user in RAM 326 or a non-volatile store (not shown) for execution by microprocessor 338. Such flexibility in application installation increases the functionality of mobile device 102 and may provide enhanced on-device functions, communication-related functions, or both. For example, secure communication applications may enable electronic commerce functions and other such financial transactions to be performed using mobile device 102.

In a data communication mode, a received signal such as a text message, an e-mail message, or web page download will be processed by communication subsystem 311 and input to microprocessor 338. Microprocessor 338 will further process the signal for output to display 322 or alternatively to auxiliary I/O device 328. A user of mobile device 102 may also compose data items, such as e-mail messages, for example, using keyboard 332 in conjunction with display 322 and possibly auxiliary I/O device 328. Keyboard 332 may comprise a complete alphanumeric keyboard and/or telephone-type keypad. In various embodiments, keyboard 332 may comprise a virtual keyboard, a physical keyboard, or both. These composed items may be transmitted over a communication network through communication subsystem 311. For voice communications, the overall operation of mobile device 102 is substantially similar, except that the received signals would be output to speaker 334 and signals for transmission would be generated by microphone 336. Alternative voice or audio I/O subsystems, such as a voice message recording subsystem, may also be implemented on mobile device 102. Although voice or audio signal output may be accomplished primarily through speaker 334, display 322 may also be used to provide an indication of the identity of a calling party, duration of a voice call, or other voice call related information, as some examples.

Serial port 330 in FIG. 3 is normally implemented in a personal digital assistant (PDA)-type communication device for which synchronization with a user's desktop computer is a desirable, albeit optional, component. Serial port 330 enables a user to set preferences through an external device or software application and extends the capabilities of mobile device 102 by providing for information or software downloads to mobile device 102 other than through a wireless communication network. The alternate download path may, for example, be used to load an encryption key onto mobile device 102 through a direct and thus reliable and trusted connection to thereby provide secure device communication. Short-range communications subsystem 340 of FIG. 3 is an additional optional component that provides for communication between mobile device 102 and different systems or devices, which need not necessarily be similar devices. For example, subsystem 340 may include an infrared device and associated circuits and components, or a BLUETOOTH™ communication module to provide for communication with similarly enabled systems and devices. BLUETOOTH™ is a registered trademark of Bluetooth SIG, Inc.

Figure 4:
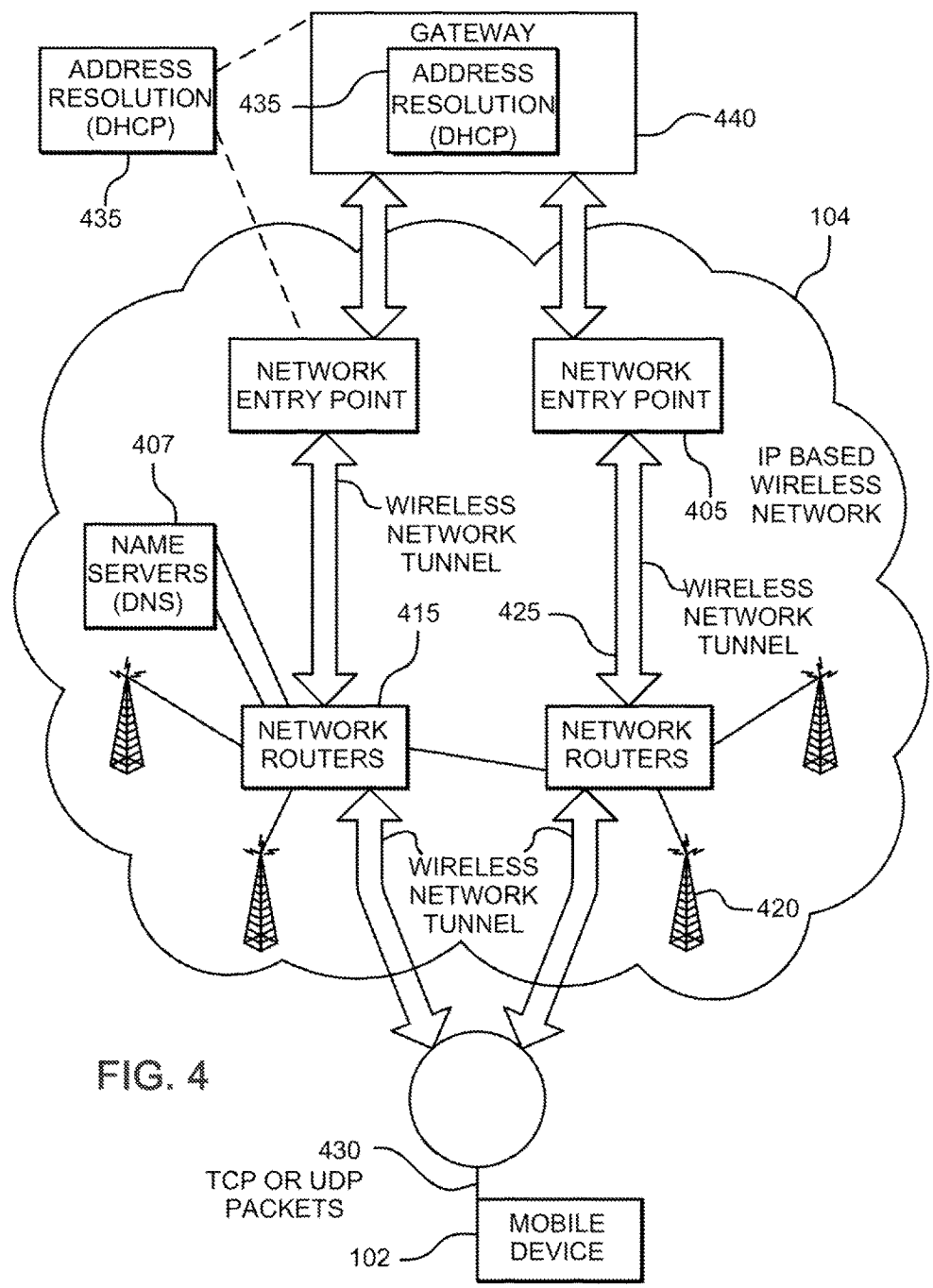
FIG. 4 is an illustration of relevant network components for facilitating communication, via the cellular telecommunications network, between the host server of the LAN and the mobile device.

FIG. 4 shows a system structure which helps provide one or more communication services of a host server for mobile devices via a wireless network. In particular, FIG. 4 shows basic components of an IP-based wireless packet data network which may be utilized for facilitating data-synchronized communications. The host server (e.g. host server 230 of FIG. 2), which is present via a gateway 440) is operative to maintain data synchronization with mobile devices over wireless network 104 (or other suitable network) for user data of an application program (e.g. PIM) associated with a user account.

As shown in FIG. 4, gateway 440 may be coupled to an internal or external address resolution component 435 and one or more network entry points 405. Data packets are transmitted from gateway 440, which is source of information to be transmitted to mobile device 102 (e.g. from the host server), through wireless network 104 by setting up a wireless network tunnel 425 from gateway 440 to mobile device 102. In order to create this wireless tunnel 425, a unique network address is associated with mobile device 102. In an IP-based wireless network, however, network addresses are typically not permanently assigned to a particular mobile device 102 but instead are dynamically allocated on an as-needed basis. Thus, mobile device 102 may acquire a network address and gateway 440 may determine this address so as to establish wireless tunnel 425.

Network entry point 405 is generally used to multiplex and demultiplex amongst many gateways, corporate servers, and bulk connections such as the Internet, for example. There are normally very few of these network entry points 405, since they are also intended to centralize externally available wireless network services. Network entry points 405 often use some form of an address resolution component 435 that assists in address assignment and lookup between gateways and mobile devices. In this example, address resolution component 435 is shown as a dynamic host configuration protocol (DHCP) as one method for providing an address resolution mechanism.

A central internal component of wireless network 104 is a network router 415. Normally, network routers 415 are proprietary to the particular network, but they could alternatively be constructed from standard commercially available hardware. The purpose of network routers 415 is to centralize thousands of fixed transceiver stations 420 normally implemented in a relatively large network into a central location for a long-haul connection back to network entry point 405. In some networks there may be multiple tiers of network routers 415 and cases where there are master and slave network routers 415, but in all such cases the functions are similar. Often network router 415 will access a name server 407, in this case shown as a dynamic name server (DNS) 407 as used in the Internet, to look up destinations for routing data messages. Fixed transceiver stations 420, as described above, provide wireless links to mobile devices such as mobile device 102.

Wireless network tunnels such as a wireless tunnel 425 are opened across wireless network 104 in order to allocate necessary memory, routing, and address resources to deliver IP packets. Such tunnels 425 are established as part of what are referred to as Packet Data Protocol or "PDP contexts" (i.e. data sessions). To open wireless tunnel 425, mobile device 102 must use a specific technique associated with wireless network 104. The step of opening such a wireless tunnel 425 may require mobile device 102 to indicate the domain, or network entry point 405 with which it wishes to open wireless tunnel 425. In this example, the tunnel first reaches network router 415 which uses name server 407 to determine which network entry point 405 matches the domain provided. Multiple wireless tunnels can be opened from one mobile device 102 for redundancy, or to access different gateways and services on the network. Once the domain name is found, the tunnel is then extended to network entry point 405 and necessary resources are allocated at each of the nodes along the way. Network entry point 405 then uses the address resolution (or DHCP 435) component to allocate an IP address for mobile device 102. When an IP address has been allocated to mobile device 102 and communicated to gateway 140, information can then be forwarded from gateway 140 to mobile device 102.

The techniques of the present disclosure relate to needs for authenticated and/or secure communications for mobile devices. A digital certificate may be used for authentication or security for electronic communications. One common use of a digital certificate is to verify that a user sending a message is who he/she claims to be and to provide the receiver with the means to encode a reply. The digital certificate is based on a cryptographic system that uses two keys, a public key which is publicly available and a private (or secret) key known only to the holder of the digital certificate. When user A wants to send a secure message to user B, user A uses user B's public key to encrypt the message. User B then uses the private key of user B to decrypt the message. The public and private keys are related in such a way that only the public key can be used to encrypt messages and only the corresponding private key can be used to decrypt them; it is virtually impossible to deduce the private key if one knows only the public key. Private keys may also be used to sign a request, where the corresponding public key may be used to decipher the signed request.

A digital certificate includes a collection of data used to verify the identity of the holder of the certificate. A digital certificate (e.g. a X.509 based certificate) may contain information which includes identifiers or indicators of a version, a serial number, a certificate issuer, a certificate holder, a validity period (the certificate is not valid before or after this period), attributes (known as certificate extensions, that contain additional information such as allowable uses for this certificate), a digital signature from a certification authority (CA) (to ensure that the certificate has not been altered and to indicate the identity of the issuer), a public key of the owner of the certificate, and a message digest algorithm used to create the signature. The digital signature identifies or indicates the digital certificate of the signer, and the digital certificate contains a digital signature which further identifies or indicates another digital certificate. In general, each digital certificate is verified through the use of another digital certificate, creating a chain of digital certificates that ends with the root digital certificate. The owner of the root certificate is the root certification authority.

Figure 11:
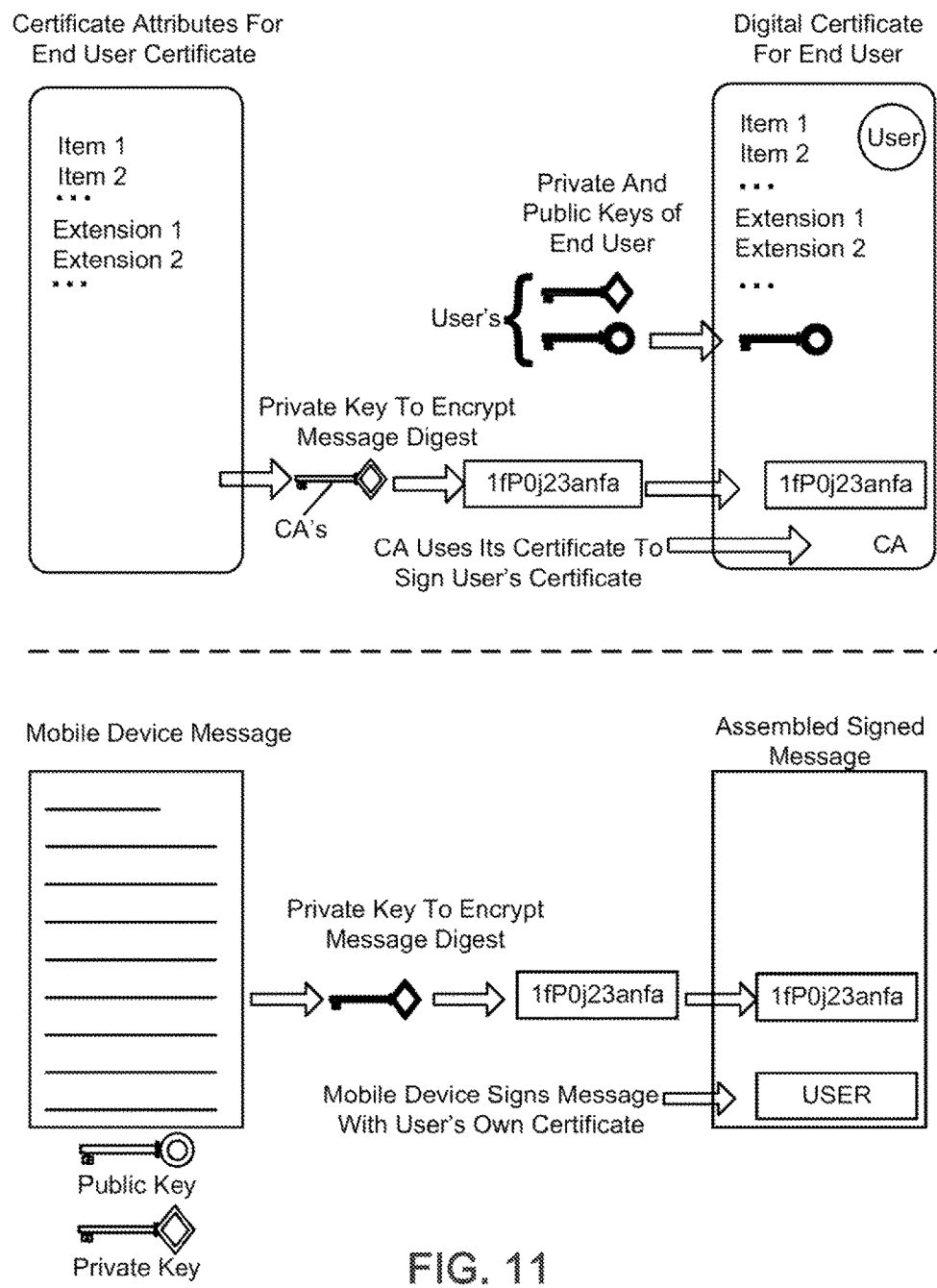
FIG. 11 is an illustration of an exemplary digital certificate and techniques for creating and utilizing the digital certificate.

Referring ahead with general reference to FIG. 11, the mobile device equipped with a digital certificate may sign or provide a unique signature in the message. The signature identifies or indicates a digital certificate associated with the mobile device. In particular, the message's creator signs the message with use of a private key associated with the digital certificate. The digital certificate contains the corresponding public key which is used to decrypt the message digest to verify the signature. So that the validity of the user's certificate may be verified, the digital certificate is also signed based on another digital certificate associated with the CA. In general, the signature of every digital certificate the CA issues refers to its own signing certificate. When the CA creates a digital certificate, it uses its private key to encrypt the certificate's message digest. The digital certificate of the CA includes the public key needed to verify the digital certificate of the CA and to decrypt the message digest of the user's digital certificate. Continuing through the certificate chain, the digital certificate of the CA is signed using the certificate of the authority who issued that certificate. The chain can go on through any number of intermediate certificates, but the original issuer of the CA's certificate is the "root" certification authority. Note that the certificate of the root CA, unlike the others, is "self signed." That is, it does not refer to a further certification authority but is signed using the root CA's own private key; the chain stops here. The certificate of the root CA can be verified by creating a digest and comparing it with one widely available. Typically, the root certificate and root CA's public key are stored in the application or the device that needs to verify the signature.

Figure 5:
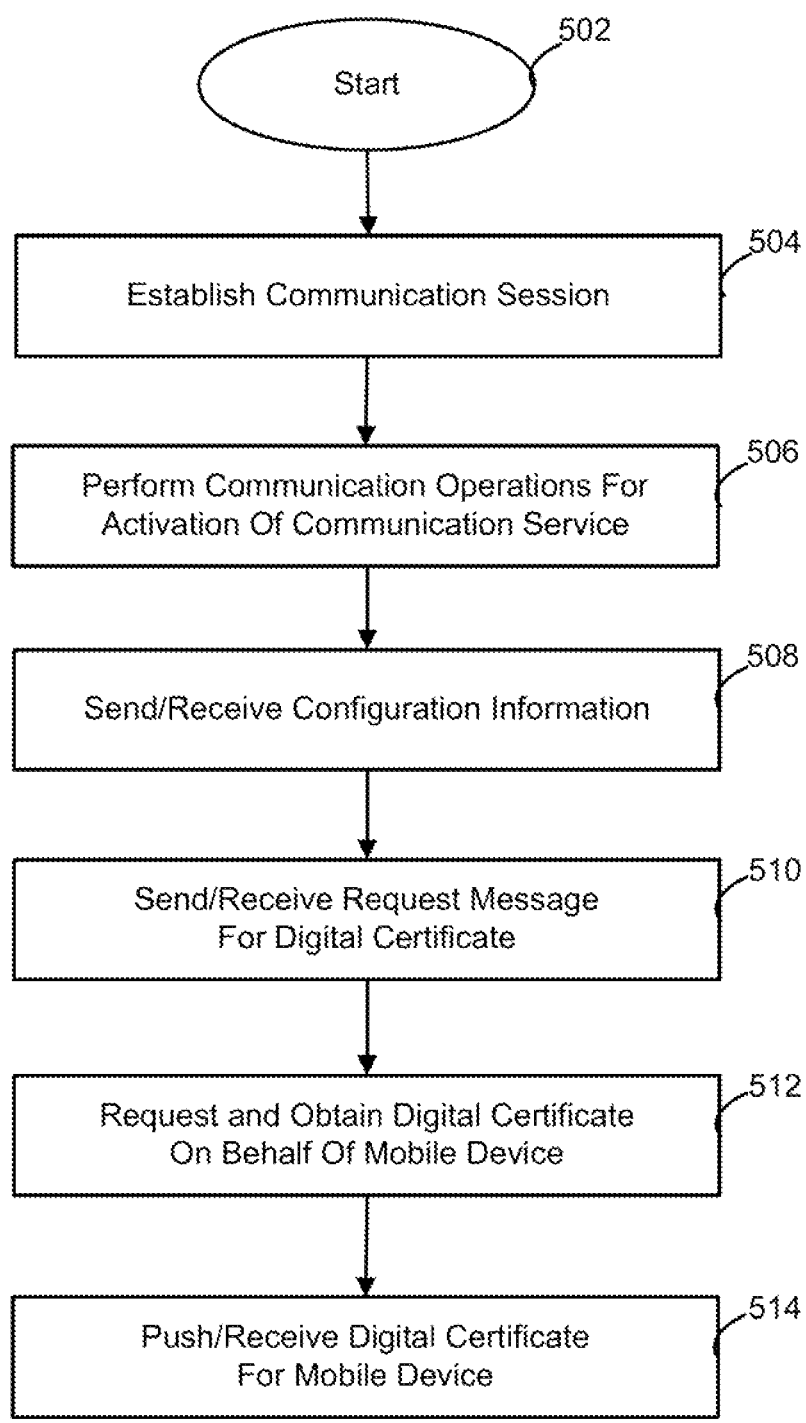
FIG. 5 is a flowchart of a method for use in enabling the mobile device with a digital certificate from a certificate authority (CA)

Referring now to FIG. 5, a flowchart of a method for use in enabling the mobile device with a digital certificate from a CA is shown. The techniques may be embodied in the host server, the mobile device, and/or components thereof. In a computer program product related to the host server or mobile device, a computer readable medium has computer instructions stored therein which are executable by one or more processors for performing the method.

In the embodiment described in relation to FIG. 5, the mobile device is initially not activated for the communication service of the host server, and cannot obtain access to the communication network via the WLAN. There is a need to activate and otherwise configure the mobile device for communication service(s).

Beginning at a start block 502 of FIG. 5, for activating the communication service and otherwise configuring the mobile device, a communication session is established between the host server and the mobile device (step 504 of FIG. 5). This communication session may be facilitated over a wireless link with the cellular telecommunications network, or over the wired connection with the computer connected in the communication network, as examples. In many situations, this communication session is over a secure connection (e.g. an encrypted or tunneled connection).

In the communication session, communication operations are performed for activating the communication service (e.g. the data synchronization service) with the host server (step 506 of FIG. 5). When the mobile device is properly activated for the communication service, the host server creates a stored mapping of a user account name or identifier of the user account with a unique identifier of the mobile device (e.g. a personal identification number or "PIN"). When communications are required with the mobile device, the unique identifier of the mobile device is used to route the messages to/from the device through the system.

In the communication session, configuration information (or "profile") is also sent from the host server and received by the mobile device (step 508 of FIG. 5). This configuration information includes a CA profile or information which instructs the mobile device to obtain one or more digital certificates from one or more particular CAs outside of the communication network. The information is also for use by the mobile device in actually constructing one or more request messages for obtaining the one or more digital certificates from the one or more CAs outside of the communication network.

After receipt of the configuration information, the mobile device generates a private/public key pair for the digital certificate, constructs the request message for obtaining the digital certificate (including most if not all pertinent information), and causes the request message to be sent to the host server which receives it (step 510 of FIG. 5). In some embodiments, the request message includes a Public Key Cryptography Standard (PKCS) message.

Based on the information in the request message, the host server requests and obtains the digital certificate from the CA on behalf of the mobile device (step 512 of FIG. 5). In some embodiments, it may be desirable for the obtaining of the digital certificate to involve little or no processing at the mobile device after submission of the request message. Upon receipt of the digital certificate, the host server "pushes" the received digital certificate to the mobile device (step 514 of FIG. 5). In one embodiment, the host server pushes the digital certificate to the mobile device with use of the communication service (e.g. the e-mail communication service) that was activated in the communication session. Here, the mobile device may monitor for a message (e.g. an e-mail message directed to the e-mail address associated with the user or user account of the mobile device) via the host server and, in response to its receipt, parse the message and store the digital certificate in the appropriate keystore for subsequent communications. This monitoring and storing in the mobile device may be automatic, requiring little or no user intervention, and being transparent to the user. In another embodiment, the host server pushes the digital certificate to the mobile device over a different channel or under a different message type, where it may be handled by the mobile device in the same or substantially the same manner.

In any case, the mobile device receives the digital certificate and stores it for use in subsequent communications. For example, the mobile device may thereafter obtain access to the communication network via the WLAN which is adapted to authenticate the mobile device based on the digital certificate. However, the digital certificate obtained for the mobile device may be utilized for any suitable communication purpose. For example, the digital certificate may be for use in authenticating the mobile device for communication access in a wireless communication network. Alternatively, for example, the digital certificate may be for use in encryption and decryption of e-mail or other message communications of the mobile device. As another example, the digital certificate may be utilized to obtain access to user data of a user account on a server via the Internet (e.g. a bank account or credit card account of the user).

In one embodiment of the present techniques, the digital certificate is utilized for WLAN authentication of the mobile device to access the communication network having the host server. The authentication which utilizes the digital certificate is performed by an authentication server based on a security protocol, such as one based on EAP. EAP is a universal authentication framework suitable for use in wireless networks and Point-to-Point connections, and is defined in Request For Comments (RFC) 3748. In general, a mobile device operates to request connection to a WLAN through a wireless access point (AP). In response, the wireless AP requests identification data from the mobile device and transmits that data to the authentication server. In response, the authentication server asks the wireless AP for proof of the validity of the credentials. After the wireless AP obtains that verification from the mobile device, and sends it back to the authentication server which verifies the same, the mobile device is connected to the network as requested.

Note that EAP is an authentication framework, and generally not a specific authentication mechanism. The EAP provides some common functions and a negotiation of the desired authentication mechanism. Such mechanisms are typically called EAP methods, and there are currently about 40 different methods. Methods defined in Internet Engineering Task Force (IETF) RFCs include EAP-MDS, EAP-OTP, EAP-GTC, EAP-TLS, EAP-IKEv2, EAP-SIM, and EAP-AKA, and in addition, a number of vendor-specific methods and new proposals exist. Commonly used techniques suitable for wireless networks include EAP-TLS, EAP-SIM, EAP-AKA, PEAP, LEAP and EAP-TTLS. Requirements for EAP methods used in wireless LAN authentication are described in RFC 4017. When EAP is invoked by an IEEE 802.1X-enabled Network Access Server (NAS) device, such as an IEEE 802.11 wireless AP, EAP methods can provide a secure authentication mechanism and negotiate a secure Pair-wise Master Key (PMK) between the client and NAS. The PMK can then be used for a wireless encryption session which uses TKIP or CCMP (based on AES) encryption. EAP defines message formats, and each protocol that uses EAP defines a way to encapsulate EAP messages within that protocol's messages. In the case of IEEE 802.1X, this encapsulation is called "EAP over LANs" or "EAPOL".

Figure 6:
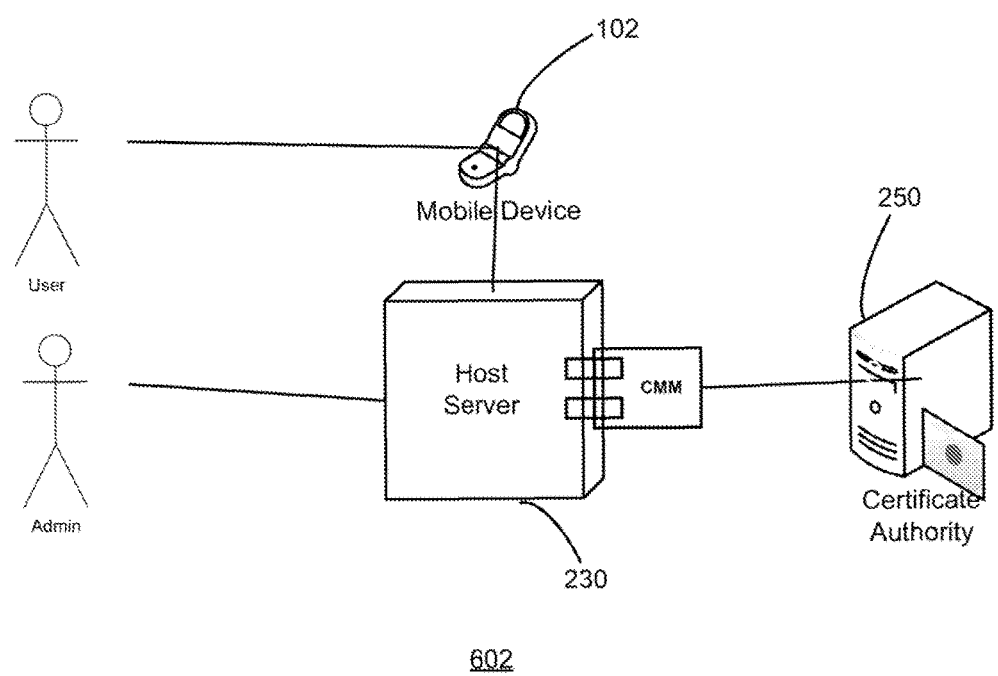
FIG. 6 is a simple illustrative diagram which shows an interaction between an administrator of the host server in the LAN, and a connection between the host server and the CA, for obtaining the appropriate digital certificate for the mobile device.

In FIG. 6, it is shown that host server 230 may be provided with a configuration interface for an administrator of the communication network for setting and controlling the configuration information for any one or all mobile devices 102 of the communication network. This may be done, for example, via a graphical user interface (GUI) of a personal computer (PC) connected in the communication network. The administrator has the ability to set CA information (e.g. in a CA profile) for one or more CAs for mobile device 102 within what may be referred to as an IT policy. The CA information may include the CA address of the CA, CA type, ports, and other details. Host server 230 is adapted to allow the CA information to be set globally for all mobile devices 102 of communication network, group-wise for a group of mobile devices 102, and/or individually for each mobile device 102. Mobile devices having such CA information are permitted or required to request certificate enrollment from the CA 250 specified in the CA information.

The CA information may be associated with or part of a WLAN profile of the mobile device 102. The WLAN profile may also be pushed to the mobile device by host server 230 in the same communication session utilized to push the CA information. Host server 230 may provide a plurality of WLAN profiles to mobile device 102, each WLAN profile having different CA information associated therewith. Each WLAN profile includes WLAN information for mobile device 102 to identify and operate with a given WLAN, and may include a unique WLAN identifier such as a Service Set Identifier (SSID) or Extended SSID (ESSID), for uniquely identifying a WLAN for wireless access. Thus, different digital certificates may be associated with different network profiles for communication access in different wireless networks. For example, a first digital certificate may be stored in association with a first network profile for communication access in a first wireless network, and a second digital certificate may be stored in association with a second network profile for communication access in a second wireless network.

Thus, host server 230 enables administrators to more easily and efficiently "roll out" enterprise-wide certificate enrollments for mobile devices. The administrator is provided with more control over where and how a mobile device requests a digital certificate. In addition to, or as an alternative to, the use of host server 230 for receipt of CA information, the CA information may be assigned to the mobile device manually by editing a user's CA information at the mobile device without receipt of CA information from host server 230.

For each CA profile, a keypair for signing the associated request is generated at the mobile device. Once a key has been generated for a CA profile, certificate enrollment requests for the CA profile are signed using that key. A new key may be generated when the CA denies the request or when the digital certificate returned from the request has expired (possible when sending the same request multiple times). When new keypairs are generated, the old keypair is removed if it exists. When requesting a digital certificate, the mobile device generates a Public Key Cryptography Standard (PKCS) request (e.g. PCKS10 request) and sends it over a PKCS10 protocol to the host server, which will perform the certificate enrollment request on behalf of the mobile device. The host server is considered a "trusted middleman"; PKCS10 streams are redirected to a certificate management module (CMM) of the host server which then retrieves CA Profile configurations from the IT Policy residing on the host server. Once the information has been retrieved, communicating with the CA is possible, and the certificate enrollment process begins. Once the CMM retrieves the certificate from the CA, it pushes the certificate back down to the mobile device. The mobile device then injects the certificates and keypair into the mobile device's keystore.

Figure 7:
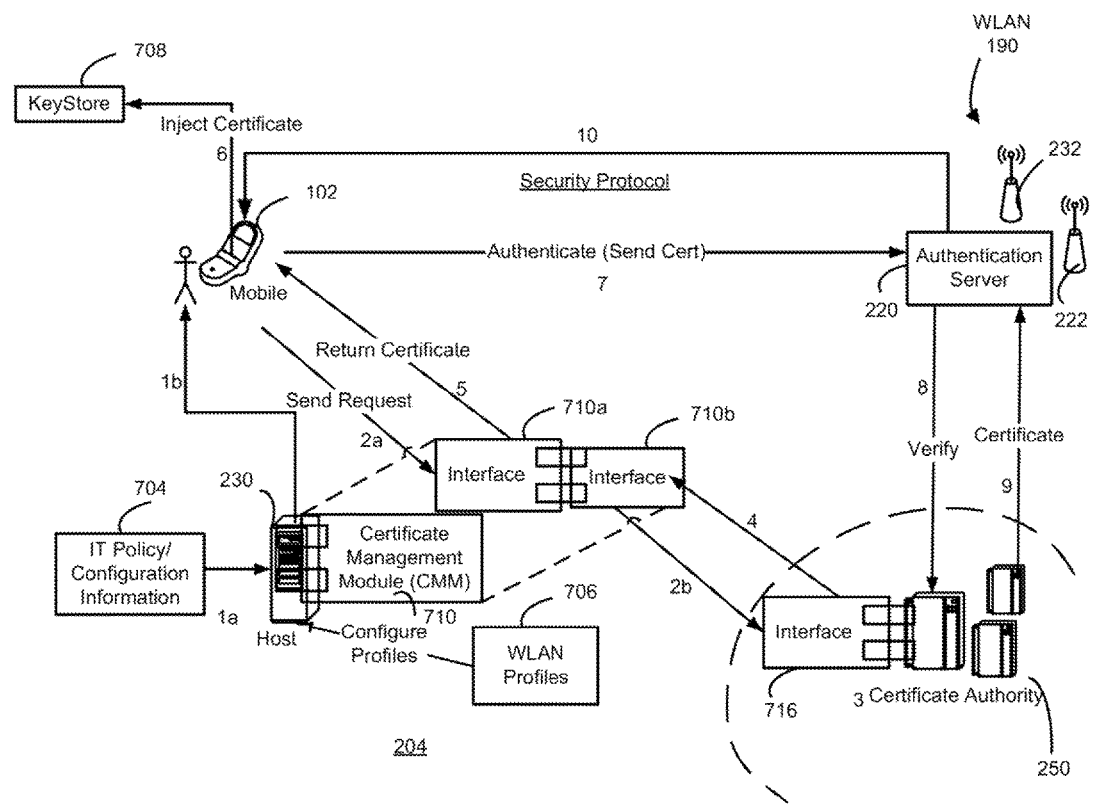
FIG. 7 is a more detailed diagram of the LAN which illustrates the message flow for obtaining the digital certificate for the mobile device from the CA, and subsequent authenticated communications of the mobile device with the WLAN.

FIG. 7 is a more detailed diagram of communication network 204, illustrating the message flow for obtaining a digital certificate for mobile device 102 from CA 250, as well as subsequent authenticated communications of mobile device 102 through WLAN 190. As shown in FIG. 7, host server 230 may include a certificate management module 710 having a mobile communication interface 710a and CA communication interface 710b. In addition, FIG. 8 is a message flow diagram 802 for obtaining the digital certificate for mobile device 102 from CA 250, which includes the case where the digital certificate is accepted or denied immediately or within a reasonably short timeframe.

Figure 8:
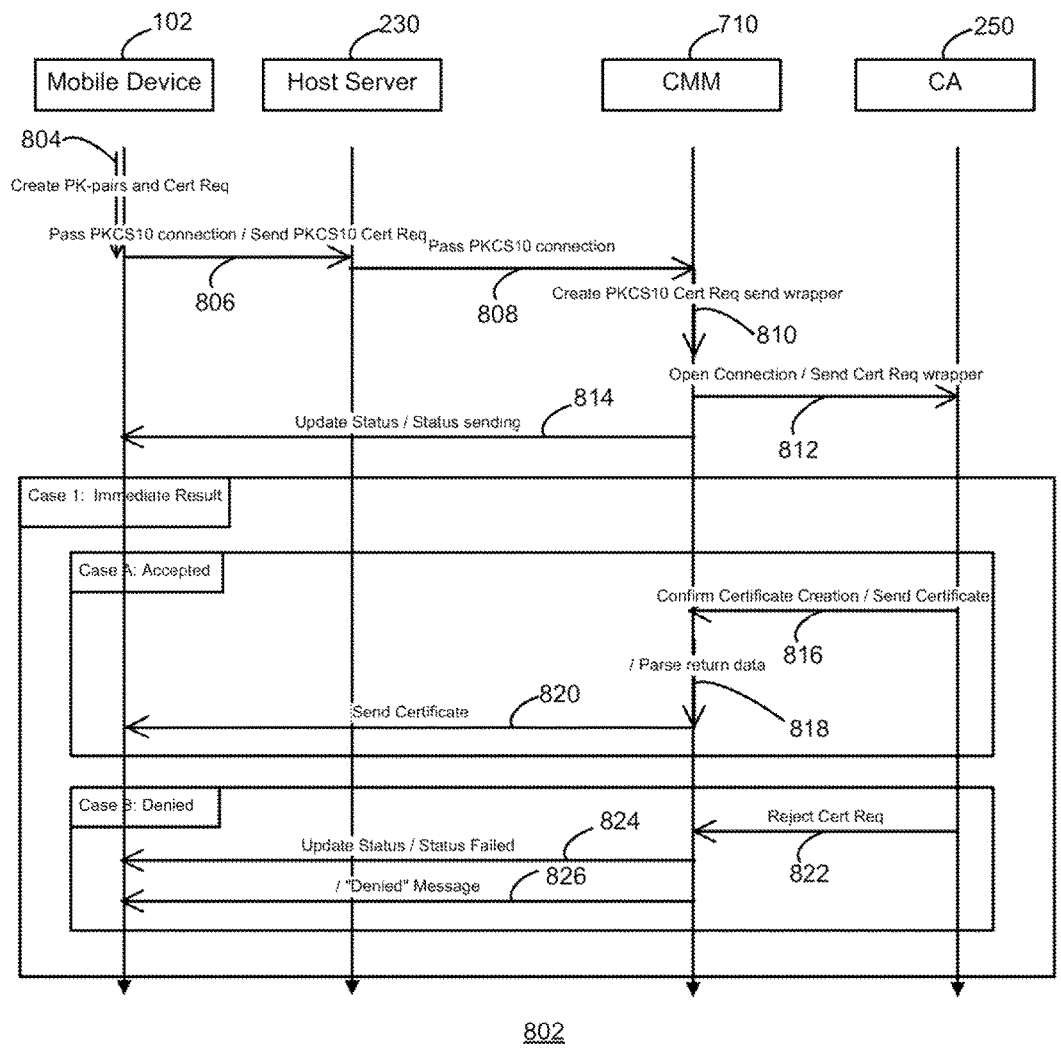
FIG. 8 is a message flow diagram for obtaining the digital certificate for the mobile device from the CA, which includes the case where the digital certificate is accepted or denied immediately or within a reasonably short timeframe.

Discussion now proceeds with reference to FIGS. 7 and 8 in combination. Initially, an IT policy 704 and one or more WLAN profiles 706 are configured for mobile device 102, being stored in association with a user account of mobile device 102 (see flow 1a of FIG. 7). The configuration may be done by the administrator of communication network 204 through an interface with host server 230 (e.g. via a GUI of a PC connected in communication network 204). The IT policy 704 has the CA information for instructing mobile device 102 to obtain one or more digital certificates from one or more particular CAs outside of communication network 204. The CA information is also for use by mobile device 102 in constructing one or more request messages for obtaining the one or more digital certificates from the one or more CAs.

An example of such information is provided in Table 1 below.

TABLE 1

Example Of Configuration Information For Obtaining Digital Certificate.

| | |
|---|---|
| CA Host | sec1dc01.svvsec1.testnet.rim.net |
| CA Base Query | cn=users,dc=svvsec1,dc=testnet,dc=rim,dc=net |
| CA Port | 389 |
| CA Login | testUser:password |
| CA Attributes | Template:myTemplate |
| CA Identification | Both |

On the other hand, each WLAN profile 706 includes WLAN information for mobile device 102 to identify and operate with a given WLAN. Such WLAN information may include a unique WLAN identifier, such as a SSID or ESSID, for uniquely identifying the WLAN for wireless access. Each WLAN profile 706 may have different CA information associated therewith. The IT policy 704 and WLAN profiles 706 are pushed to mobile device 102 (see flow 1b of FIG. 7), e.g., in the context and manner previously described herein, such as in relation to FIG. 4.

Mobile device 102 then creates a private key and a public key for the digital certificate, and a PKCS10 request block is created for requesting a digital certificate (see flow 804 of FIG. 8). The PKCS10 request block is sent to host server 230 (see flow 2a of FIG. 7, and flow 806 of FIG. 8). In general, host server 230 then proceeds to obtain the digital certificate from the CA 250 on behalf of mobile device 102. In particular, CMM 710 receives the request block (see flow 808 of FIG. 8), and appends any additional information which the CA 250 may need (see flow 810 of FIG. 8). This new request is sent from CMM 710 to the appropriate CA 250 specified (see flow 2b of FIG. 7, and flow 812 of FIG. 8). As an option, CMM 710 may send a status message (e.g. "pending" or "sending") to mobile device 102, so that mobile device 102 indicates in its visual display that the digital certificate process is "pending" or "sending" or the like (see flow 814 of FIG. 8).

Assuming the CA 250 grants approval, the CA 250 informs CMM 710 that the digital certificate has been generated (see flow 3 of FIG. 7). In response, CMM 710 retrieves the digital certificate of mobile device 102 from the CA 250 (see flow 4 of FIG. 7, and flow 816 of FIG. 8). The retrieval may be performed through use of Lightweight Directory Access Protocol (LDAP) or Hypertext Transfer Protocol (HTTP) communication, or involve other protocols such as Server Cache Synchronization Protocol (SCEP) or Certificate Management Protocol (CMP). Upon receipt, CMM 710 parses the data (see flow 818 of FIG. 8) and "pushes" the digital certificate to mobile device 102 (see flow 5 of FIG. 7, and flow 820 of FIG. 8). Mobile device 102 receives and stores the digital certificate in a certificate keystore 708 (see flow 6 of FIG. 7). Mobile device 102 may then indicate in its visual display or provide a notification via audible or haptic feedback, or via another user interface, that the digital certificate process is "complete" or the like.

In one embodiment, CMM 710 is configured to communicate with different types of CAs which utilize or require different communication protocols. Some of these protocols include, for example, LDAP, HTTP, SCEP, CMP, etc. Thus, CMM 710 may communicate with CA 250 in accordance with one of a plurality of different CA protocol information sets which are "known" or configured at CMM 710. Here, different CA protocol information sets are stored in association with different CA identifiers or indications, in a table or the like. In the request message from mobile device 102, CMM 710 receives information corresponding to the particular CA (e.g. name or address of CA) or its protocol type(s). In response to this information, CMM 710 utilizes the particular protocol information set which corresponds to this information (i.e. CMM 710 communicates with the CA in accordance with the protocol information set).

Sometime after the certificate acceptance, mobile device 102 attempts to connect in WLAN 190 (via wireless APs 222 or 232, for example), where authentication is required by authentication server 220 (see flow 7 of FIG. 7). Verification of the identity of mobile device 102 is sent to authentication server 220. Authentication server 220 attempts to verify the identity of mobile device 102 with use of the digital certificate of mobile device 102 from CA 250. If there is a locally-stored digital certificate for mobile device 102, authentication server 220 utilizes it for authentication; otherwise, authentication server 220 requests the digital certificate of mobile device 102 from CA 250 (see flow 8 of FIG. 7). CA 250 processes the request and returns the digital certificate of mobile device 102 (see flow 9 of FIG. 7). Assuming a positive verification, authentication server 220 authorizes mobile device 102 access to communication network 204 via WLAN 190.

On the other hand, if the request for the digital certificate is denied by CA 250, a rejection message is sent to CMM 710 (see flow 822 of FIG. 8). CMM 710 may send a status message (e.g. "failed" or "denied") to mobile device 102, so that mobile device 102 can indicate in its visual display or provide a notification via audible or haptic feedback, or via another user interface, that the digital certificate process has failed (see flow 824 of FIG. 8) or been denied (see flow 826 of FIG. 8).

Figure 9:
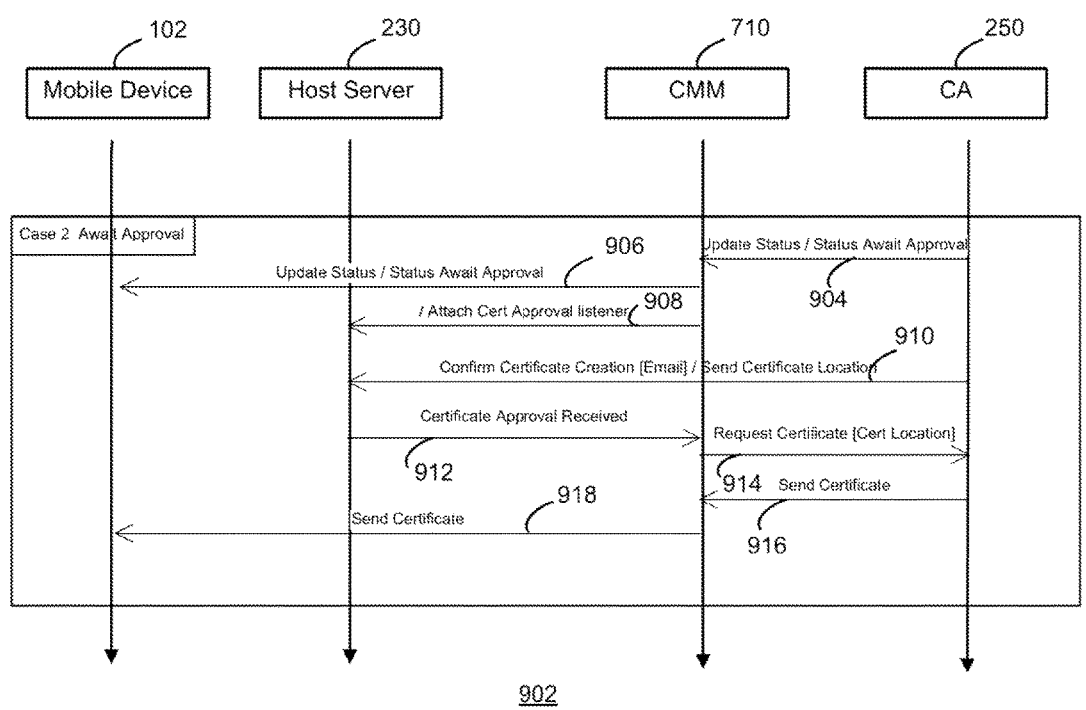
FIG. 9 is an extension the message flow diagram of FIG. 8, showing the case where receipt of the digital certificate is delayed due to an approval process for the digital certificate by the CA.
Figure 10:
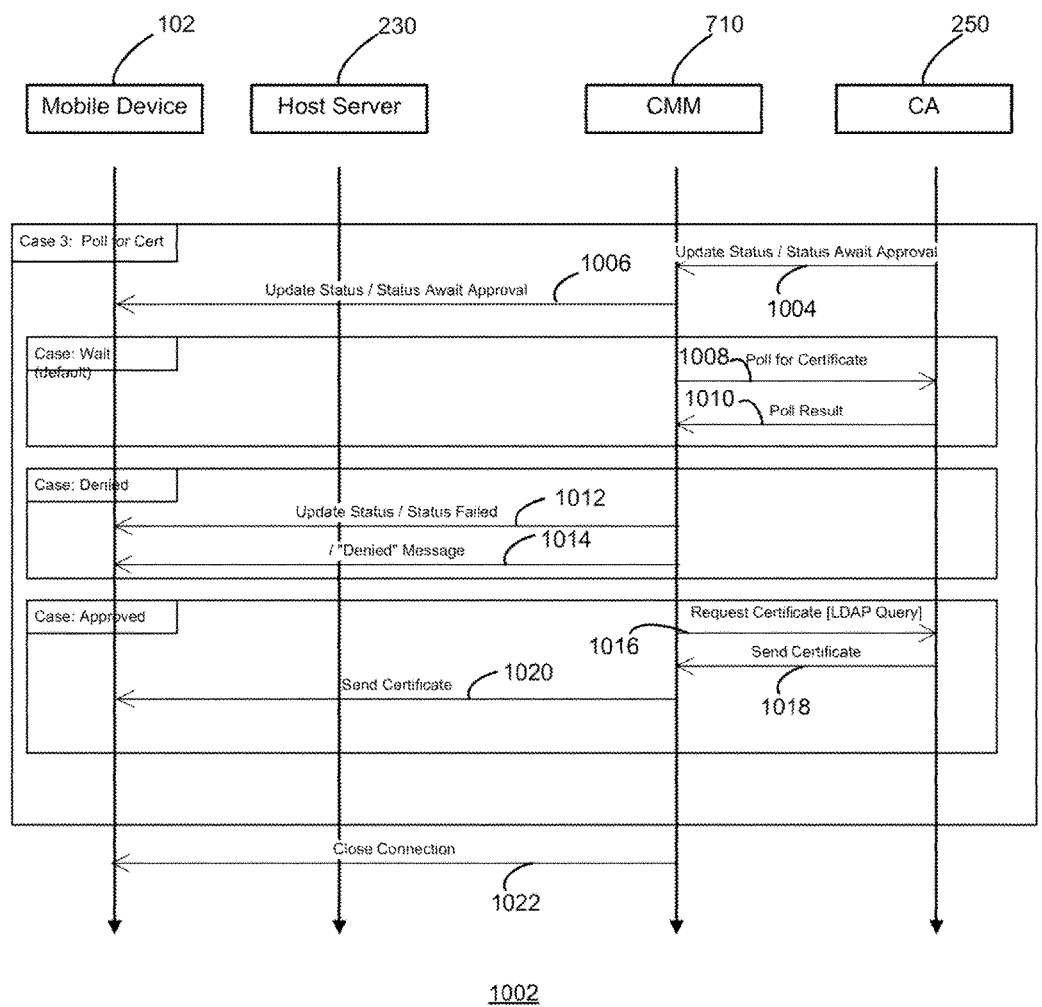
FIG. 10 is another extension of the message flow diagram of FIG. 8, showing the case where a polling process is utilized to obtain the digital certificate from the CA.

Especially in cases where human interaction or involvement may be required by CA 250, or other situations where creation of the digital certificate may be delayed, additional processes may be taken. FIG. 9 is an extension 902 of the message flow diagram 802 of FIG. 8, showing the case where receipt of the digital certificate is delayed due to an approval process for the digital certificate by CA 250. Further, FIG. 10 is another extension 1002 of the message flow diagram 802 of FIG. 8, showing the case where a polling process is utilized to obtain the digital certificate from CA 250.

Referring first to FIG. 9, if the digital certificate process may be delayed in CA 250, a status message to await approval is sent from CA 250 to CMM 710 (see flow 904 of FIG. 9). CMM 710 may, in turn, send a status message (e.g. "await approval") to mobile device 102, so that mobile device 102 indicates in its visual display or provides a notification via audible or haptic feedback, or via another user interface, that the digital certificate process requires further time or processing (see flow 906 of FIG. 8). CMM 710 provides an indication in host server 230 to monitor for the approval (or completion, or receipt) of the digital certificate from CA 250 (see flow 908 of FIG. 9). CMM 710 may disconnect from CA 250 at this time.

In response to the indication from CMM 710, host server 230 does indeed monitor for the indication from CA 250 for when the digital certificate has been approved or completed. In particular, host server 230 may monitor for a message, such as an e-mail message, from CA 250 which is sent in response to the approval. If the message is an e-mail message, the e-mail message may be addressed to the user or user account associated with the mobile device, information which was contained in the request for the digital certificate. Upon receipt of the indication of approval/completion of the digital certificate, host server 230 provides an indication to CMM 710 to obtain the digital certificate. In one embodiment, CMM 710 requests and retrieves the digital certificate (see flow 914 and 916 of FIG. 9, respectively) at a specified location or address provided by CA 250 along with the status message to await approval. Upon receipt, CMM 710 parses the data and "pushes" the digital certificate to mobile device 102 (see flow 918 of FIG. 9). Mobile device 102 receives and stores the digital certificate in a certificate keystore, and may then indicate in its visual display or provide a notification via audible or haptic feedback, or via another user interface, that the digital certificate process is "complete" or the like.

In one embodiment, the host server pushes the digital certificate to the mobile device with use of the communication service (e.g. the e-mail communication service) that was previously activated in the communication session. Here, the mobile device may monitor for a message (e.g. an e-mail message directed to the e-mail address associated with the user, user account, or mobile device) via the host server and, in response to its receipt, parse the message and store the digital certificate in the appropriate keystore for subsequent communications. This monitoring and storing in the mobile device may be automatic, requiring little or no user intervention, and being transparent to the user. In another embodiment, the host server pushes the digital certificate to the mobile device over a different channel or under a different message type, where it may be handled by the mobile device in the same or substantially the same way.

Referring next to FIG. 10, if the digital certificate process may be delayed in CA 250, a status message to await approval is sent from CA 250 to CMM 710 (see flow 1004 of FIG. 10). CMM 710 may, in turn, send a status message (e.g. "await approval") to mobile device 102, so that mobile device 102 indicates in its visual display or provide a notification via audible or haptic feedback, or via another user interface, that the digital certificate process requires further time or processing (see flow 1006 of FIG. 10). In the meantime, CMM 710 regularly or periodically "polls" CA 250 with a polling message (see flow 1008 of FIG. 10) in order to get a poll result message (see flow 1010 of FIG. 10). The poll result message from CA 250 may indicate that the digital certificate has been approved or denied, or alternatively that approval is still pending. Such polling may be used and suitable in cases where CA 250 is not enabled to send a notification (e.g. e-mail notification) for the approved digital certificate (e.g. where CA 250 injects the digital certificate onto an LDAP server).

If the request for the digital certificate is denied by CA 250, CMM 710 may send a status message (e.g. "failed" or "denied") to mobile device 102, so that mobile device 102 indicates in its visual display or provides a notification via audible or haptic feedback, or via another user interface, that the digital certificate process has failed (see flow 1012 of FIG. 10) or been denied (see flow 1014 of FIG. 10). This may also be done after a predetermined number of polling attempts have been made, or after an expiration of a predetermined period of time, where the digital certificate has not been approved. On the other hand, if the request for the digital certificate is approved, CMM 710 retrieves the digital certificate of mobile device 102 from the CA 250 (see flow 1016 of FIG. 10). The retrieval may be performed through use of Lightweight Directory Access Protocol (LDAP) query, for example. Upon receipt, CMM 710 parses the data and "pushes" the digital certificate to mobile device 102 (see flow 1020 of FIG. 10). Mobile device 102 receives and stores the digital certificate in a certificate keystore, and may then indicate in its visual display or provide a notification via audible or haptic feedback, or via another user interface, that the digital certificate process is "complete" or the like.

In one embodiment, CA 250 may require authorization or login information for access in obtaining the digital certificate. In this case, CA 250 may notify CMM 710 of this requirement (e.g. error or authentication error). In response, CMM 710 may send a message to mobile device 102 for it to display a user input prompt at the user interface (e.g. visual or audible, etc.) for a username and/or password which may be utilized for authorization with CA 250. In response, the user enters in the username and/or password, which is sent to CA 250 via CMM 710. Assuming the information is authorized (e.g. it matches with stored username and/password), CA 250 grants access for obtaining the digital certificate.

As described herein, in one illustrative example of the present techniques, a mobile communication device causes a communication session to be established with a host server of a communication network. The mobile device performs communication operations in the communication session for activating a communication service, such as a data synchronization service, with the host server. In the communication session, the mobile device also receives configuration information which includes information for use in constructing a request message for obtaining a digital certificate from a CA. After receipt of the configuration information, the mobile device constructs the request message for the digital certificate and causes it to be sent to the host server. In response, the host server requests and obtains the digital certificate from the CA on behalf of the mobile device, and "pushes" the received digital certificate to the mobile device. The mobile device receives the digital certificate and stores it for use in subsequent communications. The host server may be part of a local area network (LAN) which includes a wireless LAN (WLAN) adapted to authenticate the mobile communication device based on the digital certificate for communication access in the WLAN.

Therefore, control and distribution of digital certificates is more easily managed with use of a procedure that is more efficient and automatic from the perspective of the user of the mobile device. The host server may act as a mediator between the mobile device and the CA—offloading communication and validation work from the mobile device. Thus, the load and amount of traffic that the mobile device itself must handle in order to obtain a digital certificate is reduced. Consequently, power consumption at the mobile device is reduced.

The above-described embodiments of the present disclosure are intended to be examples only. Those of skill in the art may affect alterations, modifications and variations to the particular embodiments without departing from the scope of the application. The invention described herein in the recited claims intends to cover and embrace all suitable changes in technology.

What is claimed is:

1. A method performed by a mobile communication device, the method comprising:
   the mobile communication device receiving configuration information from a host server over a secure connection; and
   responsive to the mobile communication device receiving the configuration information:
   the mobile communication device generating a public-private key pair of a type indicated in the configuration information;
   the mobile communication device constructing a certificate request that contains the generated public key and signing the certificate request with the generated private key; and
   the mobile communication device sending the certificate request to a certificate authority indicated in the configuration information.

2. The method as recited in claim 1, further comprising:
   responsive to the mobile communication device sending the certificate request, the mobile communication device receiving a digital certificate signed by the certificate authority indicated in the configuration information, the digital certificate containing the generated public key.

3. The method as recited in claim 2, further comprising:
   responsive to the mobile communication device receiving the digital certificate, the mobile communication device storing the digital certificate in a certificate keystore at the mobile communication device.

4. The method as recited in claim 2, further comprising:
   responsive to the mobile communication device receiving the digital certificate, the mobile communication device presenting the digital certificate to an authentication server in a certificate-based authentication process to obtain communication access in a network.

5. The method as recited in claim 4, wherein the certificate-based authentication process is an extensible authentication protocol (EAP) process.

6. The method as recited in claim 4, wherein the network is a wireless local area network (WLAN).

7. The method as recited in claim 6, further comprising:
   the mobile communication device receiving from the host server over the secure connection a WLAN profile comprising an identification of the WLAN.

8. The method as recited in claim 1, wherein the secure connection is established over a radio link between the mobile communication device and a cellular telecommunications network.

9. The method as recited in claim 1, wherein the secure connection is established over a wired connection between the mobile communication device and a computer connected in a local area network to the host server.

10. The method as recited in claim 1, further comprising:
    the mobile communication device causing a communication session to be established with the host server; and
    the mobile communication device performing communication operations in the communication session with the host server for activating a communication service provided by the host server to the mobile communication device.

11. The method as recited in claim 10, wherein the communication service comprises a data synchronization service.

12. The method as recited in claim 1, wherein the mobile communication device sending the certificate request to the certificate authority comprises:
    the mobile communication device sending the certificate request to the host server over the secure connection for the host server to send to the certificate authority on behalf of the mobile communication device.

13. The method as recited in claim 12, further comprising:
    the mobile communication device receiving from the host server a digital certificate signed by the certificate authority indicated in the configuration information, the digital certificate containing the generated public key.

14. A method performed by a host server, the method comprising:
    the host server sending configuration information to a mobile communication device over a secure connection, the configuration information indicating a key type and a certificate authority;
    the host server receiving from the mobile communication device over the secure connection a certificate request that contains a public key and that is signed by a private key, the public key and the private key forming a public-private key pair generated by the mobile communication device, the key pair of the key type indicated in the configuration information; and
    the host server sending, on behalf of the mobile communication device, the certificate request to the certificate authority indicated in the configuration information.

15. The method as recited in claim 14, further comprising:
    the host server obtaining, on behalf of the mobile communication device, a digital certificate signed by the certificate authority, the digital certificate containing the generated public key.

16. The method as recited in claim 15, wherein the digital certificate is intended for presentation by the mobile communication device to an authentication server in a certificate-based authentication process to obtain communication access in a network.

17. The method as recited in claim 16, wherein the certificate-based authentication process is an extensible authentication protocol (EAP) process.

18. The method as recited in claim 16, wherein the network is a wireless local area network (WLAN).

19. The method as recited in claim 18, further comprising:
the host server sending to the mobile communication device over the secure connection a WLAN profile comprising an identification of the WLAN.

20. The method as recited in claim 14, wherein the secure connection is established over a radio link between the mobile communication device and a cellular telecommunications network.

21. The method as recited in claim 14, wherein the secure connection is established over a wired connection between the mobile communication device and a computer connected in a local area network to the host server.

22. The method as recited in claim 14, wherein the host server provides the mobile communication device with a communication service.

23. The method as recited in claim 22, wherein the communication service comprises a data synchronization service.

24. A mobile communication device comprising:
a wireless transceiver;
one or more processors coupled to the wireless transceiver, the one or more processors being operative to receive configuration information from a host server over a secure connection and responsive to receiving the configuration information, to:
generate a public-private key pair of a type indicated in the configuration information;
construct a certificate request that contains the generated public key and sign the certificate request with the generated private key; and
send the certificate request to a certificate authority indicated in the configuration information.

25. The mobile communication device as recited in claim 24, the one or more processors being further operative, responsive to sending the certificate request, to receive a digital certificate signed by the certificate authority indicated in the configuration information, the digital certificate containing the generated public key.

26. The mobile communication device as recited in claim 25, the one or more processors being further operative, responsive to receiving the digital certificate, to store the digital certificate in a certificate keystore at the mobile communication device.

27. The mobile communication device as recited in claim 25, the one or more processors being further operative, responsive to receiving the digital certificate, to present the digital certificate to an authentication server in a certificate-based authentication process to obtain communication access in a network.

28. The mobile communication device as recited in claim 27, wherein the certificate-based authentication process is an extensible authentication protocol (EAP) process.

29. The mobile communication device as recited in claim 27, wherein the network is a wireless local area network (WLAN).

30. The mobile communication device as recited in claim 24, further comprising a cellular communication subsystem coupled to the one or more processors, wherein the secure connection is established over a radio link between the mobile communication device and a cellular telecommunications network.

31. The mobile communication device as recited in claim 24, further comprising a serial port coupled to the one or more processors, wherein the secure connection is established over a wired connection between the mobile communication device and a computer connected in a local area network to the host server.

32. The mobile communication device as recited in claim 24, the one or more processors being further operative to
cause a communication session to be established with the host server; and
perform communication operations in the communication session with the host server for activating a communication service provided by the host server to the mobile communication device.

33. The mobile communication device as recited in claim 32, wherein the communication service comprises a data synchronization service.

34. A host server operative to:
send configuration information to a mobile communication device over a secure connection, the configuration information indicating a key type and a certificate authority;
receive from the mobile communication device over the secure connection a certificate request that contains a public key and that is signed by a private key, the public key and the private key forming a public-private key pair generated by the mobile communication device, the key pair of the key type indicated in the configuration information; and
send, on behalf of the mobile communication device, the certificate request to the certificate authority indicated in the configuration information.

35. The host server as recited in claim 34, further operative to:
obtain, on behalf of the mobile communication device, a digital certificate signed by the certificate authority, the digital certificate containing the generated public key.

36. The host server as recited in claim 35, wherein the digital certificate is intended for presentation by the mobile communication device to an authentication server in a certificate-based authentication process to obtain communication access in a network.

37. The host server as recited in claim 36, wherein the certificate-based authentication process is an extensible authentication protocol (EAP) process.

38. The host server as recited in claim 36, wherein the network is a wireless local area network (WLAN).

39. The host server as recited in claim 34, wherein the host server is operative to provide the mobile communication device with a communication service.

40. The host server as recited in claim 39, wherein the communication service comprises a data synchronization service.

* * * * *